(12) United States Patent
Toriumi et al.

(10) Patent No.: US 12,197,118 B2
(45) Date of Patent: Jan. 14, 2025

(54) OPTICAL SYSTEM, IMAGING SYSTEM, AND IMAGING APPARATUS

(71) Applicants: Yuji Toriumi, Tokyo (JP); Hiroyuki Satoh, Kanagawa (JP)

(72) Inventors: Yuji Toriumi, Tokyo (JP); Hiroyuki Satoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 791 days.

(21) Appl. No.: 17/415,726

(22) PCT Filed: Jan. 21, 2020

(86) PCT No.: PCT/JP2020/001942
§ 371 (c)(1),
(2) Date: Jun. 18, 2021

(87) PCT Pub. No.: WO2020/162163
PCT Pub. Date: Aug. 13, 2020

(65) Prior Publication Data
US 2022/0086316 A1 Mar. 17, 2022

(30) Foreign Application Priority Data
Feb. 7, 2019 (JP) ................................. 2019-020399

(51) Int. Cl.
*G03B 37/00* (2021.01)
*G02B 7/18* (2021.01)
(Continued)

(52) U.S. Cl.
CPC ........... *G03B 37/00* (2013.01); *G02B 7/1805* (2013.01); *G02B 7/182* (2013.01); *G02B 13/06* (2013.01);
(Continued)

(58) Field of Classification Search
CPC ........ G03B 37/00; G03B 19/22; G03B 17/12; G03B 37/04; H04N 23/55; G02B 7/02;
(Continued)

(56) References Cited

U.S. PATENT DOCUMENTS 4,777,568 A * 10/1988 Solomon ................. F21V 21/30
359/220.1
5,644,443 A * 7/1997 Hung ........................ B60R 1/10
362/135
(Continued)

FOREIGN PATENT DOCUMENTS

CN 1629674 A 6/2005
CN 1758088 A 4/2006
(Continued)

OTHER PUBLICATIONS

Office Action issued Oct. 21, 2022 in Chinese Patent Application No. 202080012348.6, 10 pages.
(Continued)

*Primary Examiner* — Ricky D Shafer
(74) *Attorney, Agent, or Firm* — XSENSUS LLP

(57) ABSTRACT

An optical system includes two imaging optical systems, each imaging optical system including a reflective optical element having a reflecting surface and a held part at a different position from the reflecting surface, the reflecting surface configured to reflect light incident from a subject side; a first holding body configured to hold the held part of the reflective optical element of one of the imaging optical systems; and a second holding body configured to hold the held part of the reflective optical element of the other one of the imaging optical systems. When the first holding body is combined with the second holding body, the reflecting surface of the reflective optical element of the one of the imaging optical systems is opposed to the reflecting surface
(Continued)

of the reflective optical element of the other one of the imaging optical systems.

18 Claims, 19 Drawing Sheets

(51) Int. Cl.
  *G02B 7/182* (2021.01)
  *G02B 13/06* (2006.01)
  *G03B 17/12* (2021.01)
  *G03B 19/22* (2021.01)
  *H04N 23/55* (2023.01)
(52) U.S. Cl.
  CPC ............. *G03B 17/12* (2013.01); *G03B 19/22* (2013.01); *H04N 23/55* (2023.01)
(58) Field of Classification Search
  CPC ........ G02B 7/18; G02B 7/1805; G02B 7/182; G02B 13/06
  USPC .............................................. 359/504; 348/36
  See application file for complete search history.

(56) References Cited

U.S. PATENT DOCUMENTS

| | | | |
|---|---|---|---|
| 5,696,637 A * | 12/1997 | Shaffer | G02B 26/10 359/857 |
| 6,209,834 B1 | 4/2001 | Stonehouse | |
| 9,185,279 B2 * | 11/2015 | Masuda | H04N 23/65 |
| 10,295,797 B2 * | 5/2019 | Masuda | H04N 23/55 |
| 10,852,503 B2 * | 12/2020 | Toriumi | G02B 7/003 |
| 10,942,343 B2 * | 3/2021 | Toriumi | H04N 13/204 |
| 11,378,871 B2 * | 7/2022 | Satoh | G02B 13/0065 |
| 11,445,095 B2 * | 9/2022 | Fujiya | G02B 7/18 |
| 2007/0064143 A1 | 3/2007 | Soler et al. | |
| 2013/0050408 A1 | 2/2013 | Masuda et al. | |
| 2013/0063754 A1 | 3/2013 | Saisho et al. | |
| 2014/0071226 A1 | 3/2014 | Satoh et al. | |
| 2014/0132709 A1 * | 5/2014 | Satoh | G02B 27/1066 359/733 |
| 2015/0222816 A1 | 8/2015 | Shohara et al. | |
| 2016/0147045 A1 | 5/2016 | Masuda et al. | |
| 2016/0353020 A1 * | 12/2016 | Satoh | G02B 13/06 |
| 2019/0273848 A1 | 9/2019 | Satoh | |
| 2019/0293900 A1 | 9/2019 | Toriumi et al. | |
| 2019/0293913 A1 * | 9/2019 | Toriumi | H04N 23/55 |
| 2020/0348481 A1 * | 11/2020 | Toriumi | G02B 7/023 |

FOREIGN PATENT DOCUMENTS

| | | |
|---|---|---|
| CN | 101167006 A | 4/2008 |
| CN | 101356580 A | 1/2009 |
| CN | 201740956 U | 2/2011 |
| CN | 102375207 A | 3/2012 |
| CN | 105530431 A | 4/2016 |
| CN | 106168707 A | 11/2016 |
| CN | 205958830 U | 2/2017 |
| CN | 107247322 A | 10/2017 |
| CN | 109085688 A | 12/2018 |
| EP | 3 006 984 A1 | 4/2016 |
| EP | 3190780 A1 | 7/2017 |
| EP | 3 769 154 | 1/2021 |
| JP | 2002-006234 | 1/2002 |
| JP | 2005-210651 | 8/2005 |
| JP | 2007-127936 A | 5/2007 |
| JP | 2013-066163 A | 4/2013 |
| JP | 2014-056048 | 3/2014 |
| JP | 2015-34995 A | 2/2015 |
| JP | 2015-230444 | 12/2015 |
| JP | 2016-118742 A | 6/2016 |
| KR | 10-2006-0094957 A | 8/2006 |
| TW | 200406602 A | 5/2004 |
| WO | 2017/169236 A1 | 10/2017 |
| WO | WO2018/000651 A1 | 1/2018 |
| WO | 2019/181956 A1 | 9/2019 |

OTHER PUBLICATIONS

Communication pursuant to Article 94(3) EPC, issued May 2, 2022, in corresponding European Patent Application 20 704 613.7.
Japanese Office Action issued Nov. 29, 2022, in corresponding Japanese Patent Application 2019-020399, 3pp.
International Search Report issued on Apr. 9, 2020 in PCT/JP2020/001942 filed on Jan. 21, 2020.
Chinese Notice of Allowance issued May 30, 2023 in corresponding Chinese Patent Application No. 202080012348.6, 6 pages.

* cited by examiner

FIG. 3A
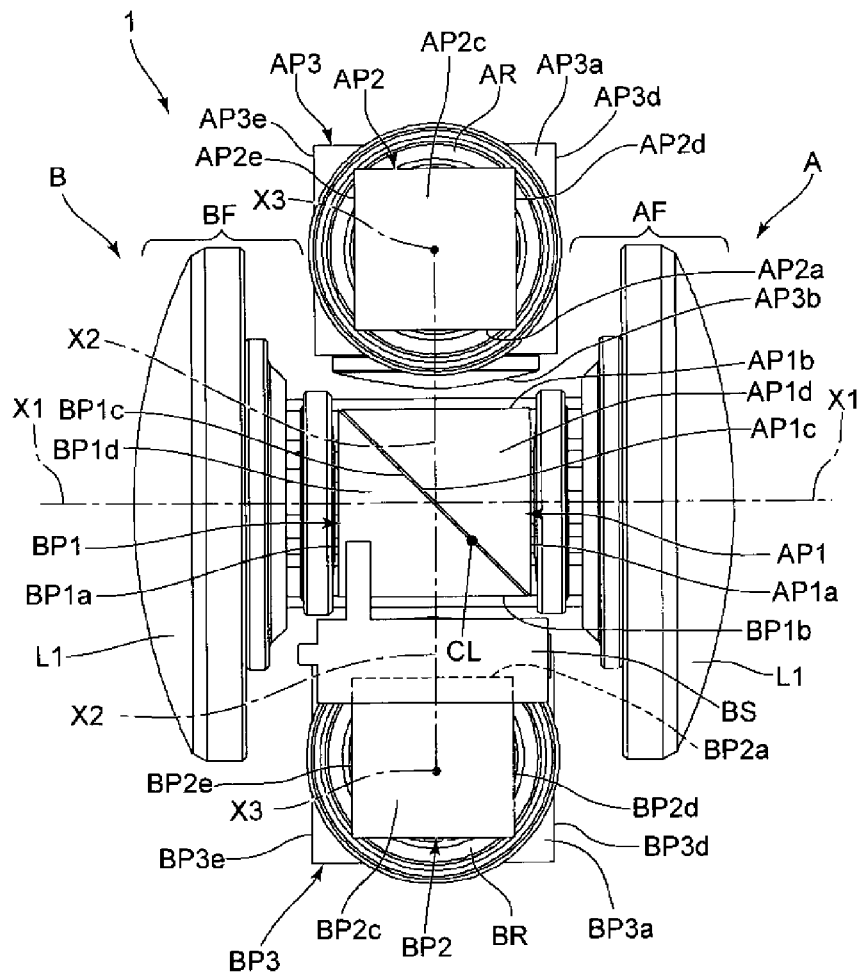
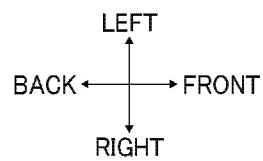

FIG. 3B
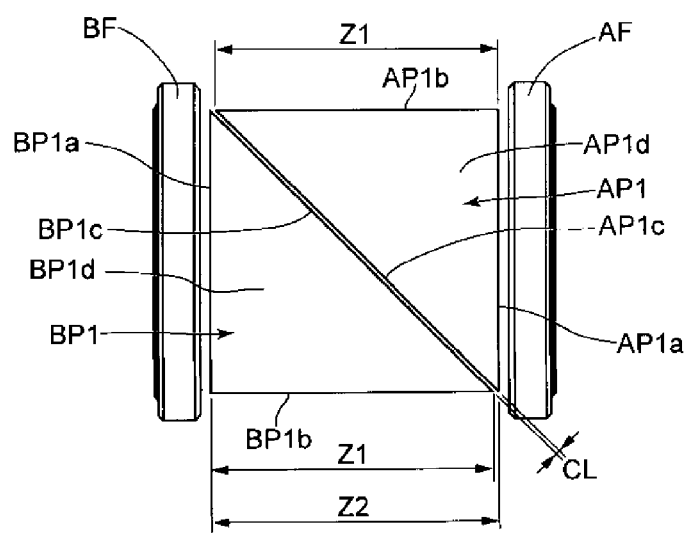
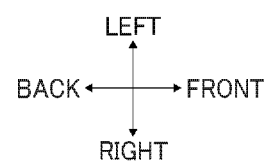

OPTICAL SYSTEM, IMAGING SYSTEM, AND IMAGING APPARATUS

CROSS-REFERENCE TO RELATED APPLICATIONS

The present application is based on PCT filing PCT/JP2020/001942, filed Jan. 21, 2020, which claims priority to JP 2019-020399, filed Feb. 7, 2019, the entire contents of each are incorporated herein by reference.

TECHNICAL FIELD

Embodiments of the present disclosure relate to an optical system for capturing an image, an imaging system incorporating the optical system, and an imaging apparatus incorporating the imaging system.

BACKGROUND ART

Spherical imaging systems are known that generate an image within a solid angle of 4π steradian by combining images captured by two image sensors (JP-6019970-B). Such spherical imaging systems include two imaging optical systems having the same configuration in which a wide-angle lens with a wide angle of view of 180 degrees or more and an image sensor that captures an image formed by the wide-angle lens are arranged. JP-6019970-B describes the technology to assemble two imaging systems into one lens barrel member.

In an optical system having a plurality of imaging optical systems with different image-capturing ranges, there is a demand to arrange the plurality of imaging optical systems in a space-saving manner so as to achieve a reduction in the size of the imaging apparatus. In addition, there is also a demand for the plurality of imaging optical systems to cover as wide image-capturing range as possible with little loss.

For example, when two imaging optical systems, whose image-capturing ranges face in the opposite directions, form a spherical-image optical system, the size of the spherical-image optical system might increase if the two imaging optical systems each having a linear optical axis are arranged in series along the direction of the optical axis so as to face in the opposite directions. In view of such a situation, the incident positions of the two imaging optical systems are desirably closer to each other along the optical axis of the incident light from a subject so as to reduce the size of the optical system. In order to achieve such a configuration, JP-6019970-B proposes the technique that bends the optical path by using a reflecting surface of, for example, a prism so as to reduce the width of each imaging optical system along the incident optical axis.

CITATION LIST

Patent Literature

[PTL 1] JP-6019970-B

SUMMARY OF INVENTION

Technical Problem

The present disclosure is made in light of the above-described situation, and an object of the disclosure is to provide an optical system with a compact size along the incident optical axis, equipped with two imaging optical systems each having a reflecting surface. Another object of the present disclosure is to provide an imaging system with a compact size along the incident optical axis, incorporating the imaging optical systems, and an imaging apparatus incorporating such an imaging system.

Solution to Problem

In view of the above, there is provided an optical system including two imaging optical systems, each imaging optical system including a reflective optical element including a reflecting surface and a held part at a different position from the reflecting surface, the reflecting surface configured to reflect light incident from a subject side; a first holding body configured to hold the held part of the reflective optical element of one of the imaging optical systems; and a second holding body configured to hold the held part of the reflective optical element of the other one of the imaging optical systems. When the first holding body is combined with the second holding body, the reflecting surface of the reflective optical element of the one of the imaging optical systems is opposed to the reflecting surface of the reflective optical element of the other one of the imaging optical systems.

Advantageous Effects of Invention

The embodiments of the present disclosure provide a compact optical system, a compact imaging system incorporating the optical system, and a compact imaging apparatus incorporating the imaging system. To provide such compact optical system, imaging system, and imaging apparatus, the held parts at different positions from the reflecting surfaces of two reflective optical elements of the imaging optical systems are held by the respective holding bodies, and the reflecting surfaces opposed to each other are brought close to each other with the position accuracy of the reflecting surfaces maintained.

BRIEF DESCRIPTION OF DRAWINGS

The accompanying drawings are intended to depict example embodiments of the present disclosure and should not be interpreted to limit the scope thereof. The accompanying drawings are not to be considered as drawn to scale unless explicitly noted. Also, identical or similar reference numerals designate identical or similar components throughout the several views.

FIG. 3A is a top view of the imaging system as a whole in FIG. 1.

FIG. 3B is an illustration of a first prism and components surrounding the first prism.

DESCRIPTION OF EMBODIMENTS

Figure 1:
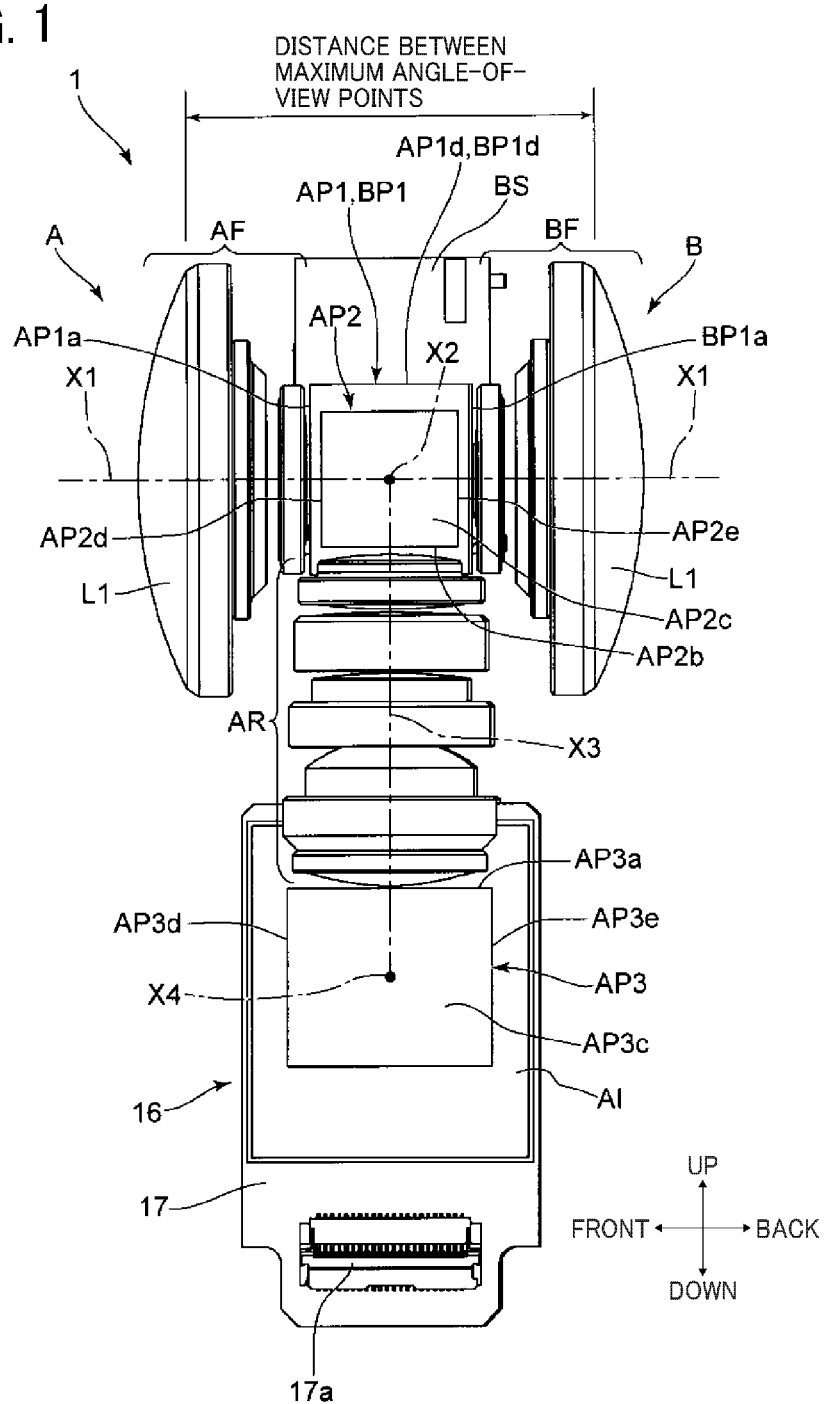
FIG. 1 is a left-side view of an imaging system that constitutes an imaging apparatus according to an embodiment.

The embodiments of the present disclosure is described with reference to the drawings. In the following embodiments, an imaging system 1 (FIGS. 1 to 3) including at least one imaging optical system A/B, a combined barrel (FIG. 6), an imaging apparatus 80 (FIGS. 17A and 17B) incorporating the combined lens barrel 10 are described in that order. The combined lens barrel 10 is formed by symmetrically combining a lens barrel 11A and a lens barrel 11B each having the same structure. As illustrated in FIG. 1, the front-to-back direction is along the incident optical axis of the imaging optical axis A/B, the up-to-down direction is parallel to a virtual line perpendicular to the incident optical axis of the imaging optical axis A/B. Further, the right-to-left direction is orthogonal to the drawing sheet of FIG. 1.

Figure 4:
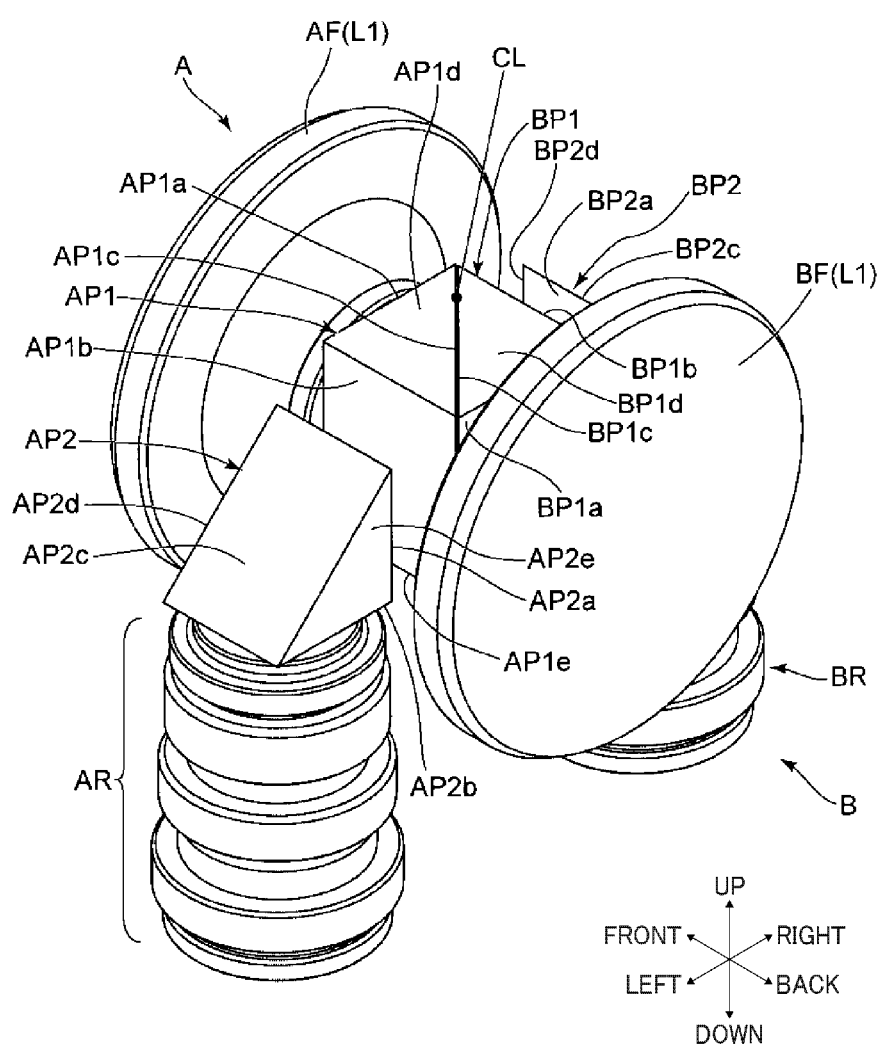
FIG. 4 is a perspective view of two image-capturing optical systems constituting the imaging optical system except for a third prism.
Figure 5:
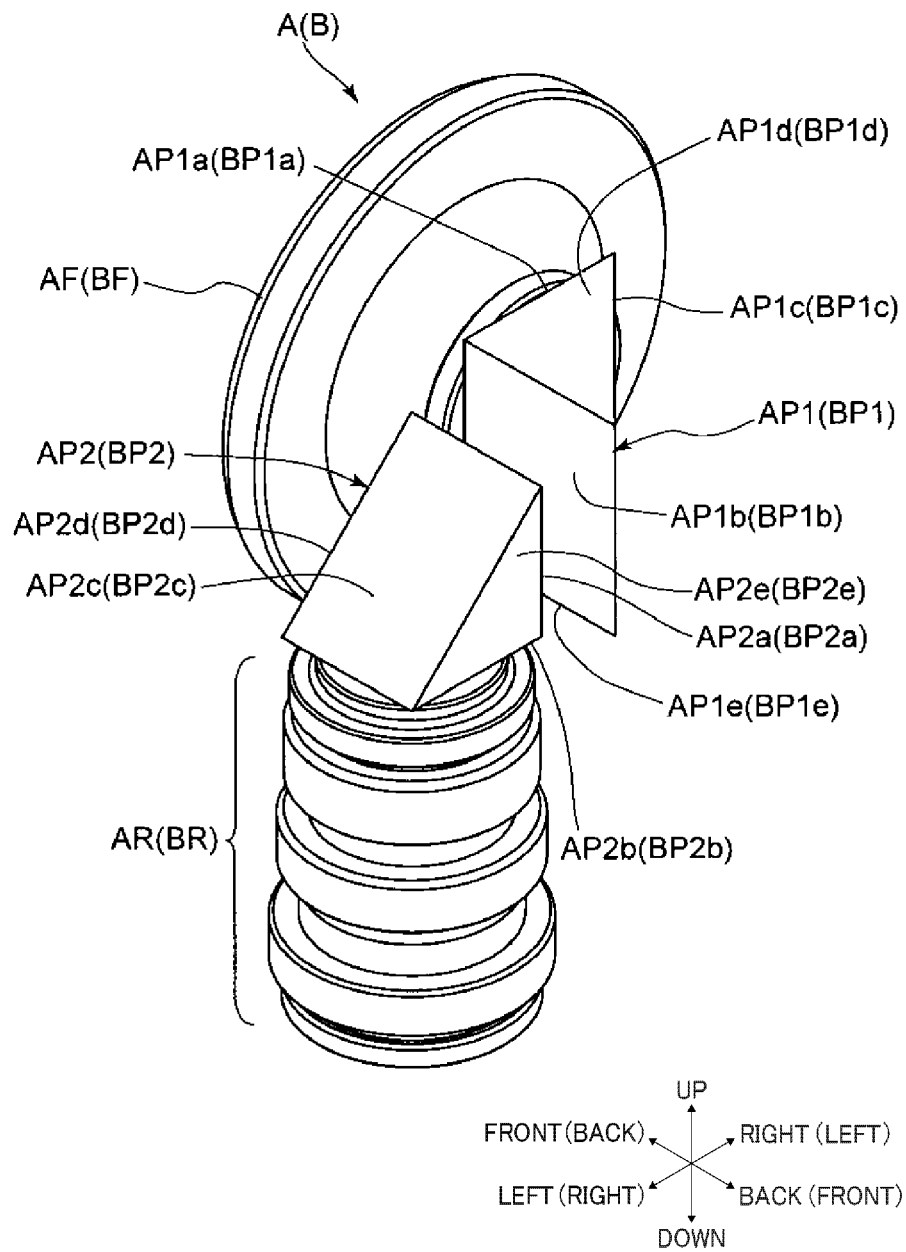
FIG. 5 is a perspective view of one of the imaging optical systems except for the third prism in FIG. 4.

The imaging system 1 includes two wide-angle lens systems (imaging optical systems) A and B arranged symmetrical to each other and two image sensors AI and BI each to form an image captured by the corresponding wide-angle lens A/B. FIG. 4 is an illustration of the two wide-angle lens systems A and B arranged within the combined lens barrel 10, and FIG. 5 is an illustration of either one of the wide-angle lens systems A and B to be held by the lens barrels 11A and 11B, respectively. In FIGS. 4 and 5, third prisms AP3 and BP3 to be described later in the wide-angle lens systems A and B are not illustrated. The two wide-angle lens systems A and B have the same specifications, and the two image sensors AI and BI have the same specifications as well. That is, the optical elements, such as lenses and prisms, constituting the wide-angle lens system A have the same configuration and optical specs with those of the wide-angle lens system B. Each of the wide-angle lens systems A and B has an angle of view greater than 180 degrees. The imaging system 1 may be configured as a spherical imaging system that combines two images formed by the image sensors AI and BI to obtain an image with a solid angle of 4π steradian. Such a combined image obtained may be generated by the image-processing circuit within the imaging apparatus 80. Alternatively, the images formed by the image sensors AI and BI may be transmitted to an external device, such as PC and server, to combine the images.

Figure 2:
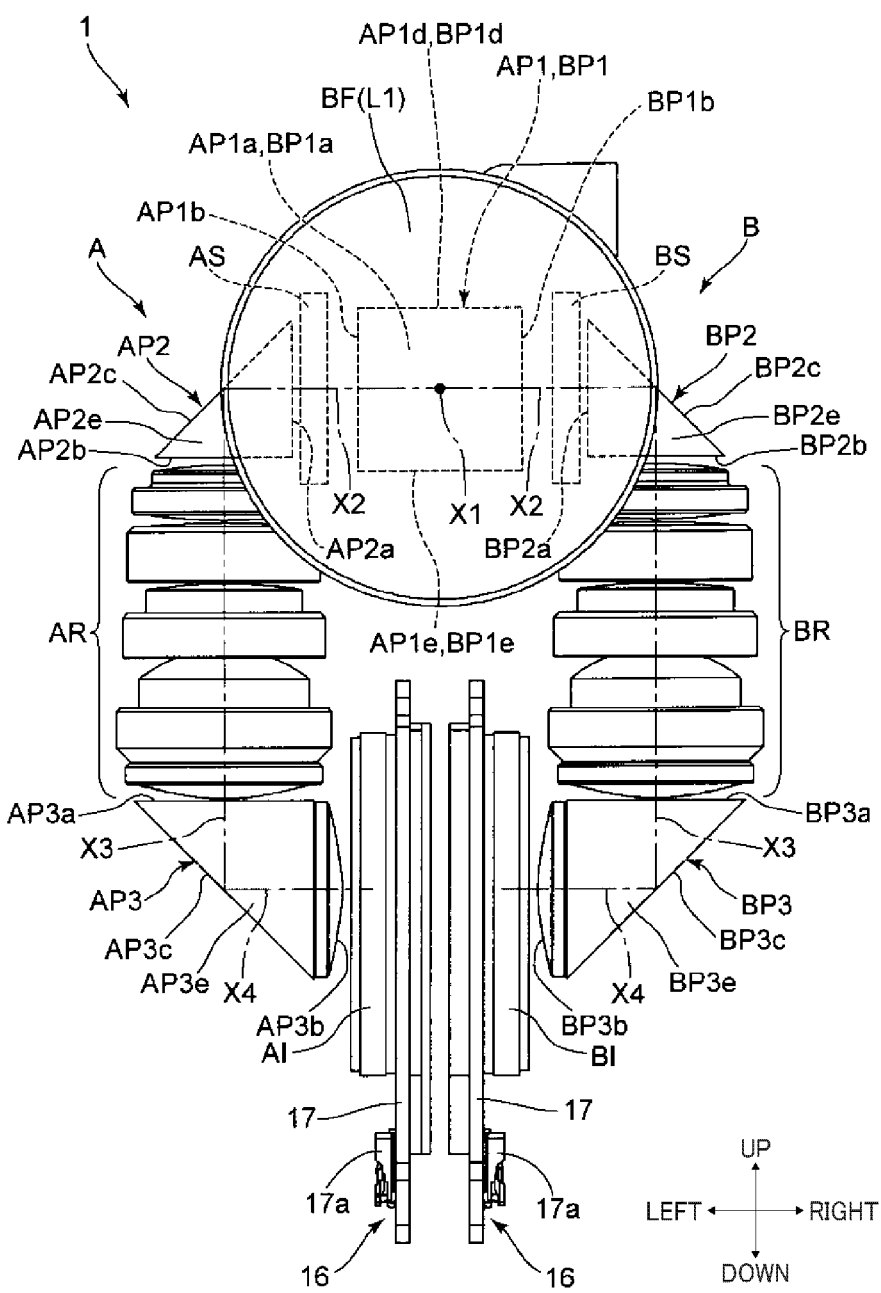
FIG. 2 is a rear view of the imaging system in FIG. 1.

The wide-angle lens system A includes a negative front group AF, a first prism (reflective optical element) AP1, a variable aperture stop AS, a second prism AP2, a positive rear group AR, and a third prism AP3, which are arranged in that order from the object (subject) side to the image side. The wide-angle lens system B includes a negative front group BF, a first prism (reflective optical element) BP1, a variable aperture stop BS, a second prism BP2, a positive rear group BR, and a third prism BP3, which are arranged in that order from the object side to the image side. The front group AF/BF is capable of capturing light rays with wide angles of view of 180° or more, and the rear group AR/BR is capable of correcting aberrations of an image formed by the lens system A/B. The variable aperture stops AS and BS are illustrated in FIG. 2.

The first prism (one reflective optical element) AP1 of the wide-angle lens system A has an incident surface AP1$a$ facing the front, and an exit surface AP1$b$ facing the left, a reflecting surface AP1$c$ having an angle of 45° with respect to the incidents surfaces AP1$a$ and AP1$b$. The first prism AP1 further has a pair of side surfaces (held parts) AP1$d$ and AP1$e$ that faces up and down, respectively. The first prism (one reflective optical element) BP1 of the wide-angle lens system B has an incident surface BP1$a$ facing the front, and an exit surface BP1$b$ facing the right, a reflecting surface BP1$c$ having an angle of 45° with respect to the incidents surfaces BP1$a$ and BP1$b$. The first prism BP1 further has a pair of side surfaces (held parts) BP1$d$ and BP1$e$ that faces up and down, respectively. Each of the reflecting surface AP1$c$ of the first prism AP1 and the reflecting surface BP1$c$ of the first prism BP1 intersect with the front-to-back direction and the right-to-left direction at an angle of 45°. Further, the reflecting surface AP1$c$ and the reflecting surface BP1$c$ are parallel to each other.

The second prism AP2 of the wide-angle lens system A includes an incident surface AP2$a$ facing the right, an exit surface AP2$b$ facing down, a reflecting surface AP2$c$ having an angle of 45° with respect to the incident surface AP2$a$ and the exit surface AP2$b$, and a pair of side surface AP2$d$ and AP2$e$ parallel to each other and facing the front and the back, respectively. The second prism BP2 of the wide-angle lens system B includes an incident surface BP2$a$ facing the right, an exit surface BP2$b$ facing down, a reflecting surface BP2$c$ having an angle of 45° with respect to the incident surface BP2$a$ and the exit surface BP2$b$, and a pair of side surface BP2$d$ and BP2$e$ parallel to each other and facing the front and the back, respectively. Each of the reflecting surface AP2$c$ of the second prism AP2 and the reflecting surface BP2$c$ of the second prism BP2 intersects with the up-and-down direction and right-to-left direction at an angle of 45°. The reflecting surface AP2$c$ and the reflecting surface BP2$c$ are symmetrically disposed right-to-left direction (the distance between the reflecting surface AP2$c$ and the reflecting BP2$c$ decreases in the upward direction).

The third prism AP3 of the wide-angle lens system A includes an incident surface AP3$a$ facing up, an exit surface AP3$b$ facing the right, a reflecting surface AP3$c$ having an angle of 45° with respect to the incident surface AP3$a$, and a pair of side surface AP3$d$ and AP3$e$ parallel to each other and facing the front and the back, respectively. The third prism BP3 of the wide-angle lens system B includes an incident surface BP3$a$ facing up, an exit surface BP3$b$ facing the left, a reflecting surface BP3$c$ having an angle of 45° with respect to the incident surface BP3$a$, and a pair of side surface BP3$d$ and BP3$e$ parallel to each other and facing the front and the back, respectively. Each of the reflecting surface AP3$c$ of the third prism AP3 and the reflecting surface BP3$c$ of the third prism BP3 intersects with the up-and-down direction and right-to-left direction at an angle of 45°. The reflecting surface AP3$c$ and the reflecting surface BP3c are symmetrically disposed right-to-left direction (the distance between the reflecting surface AP3c and the reflecting BP3c decreases in the upward direction).

Of the above prisms, the exit surfaces AP3b and BP3b of the third prisms AP3 and BP3 are formed as lens surfaces having positive power. Except for the exit surfaces AP3b and BP3b of the third prisms AP3 and BP3, the other incident surface and exit surface of each prism are formed to be plane.

In the wide-angle lens system A (one optical system), the front group AF diverges light from an object (subject) that has entered the front group AF from the front side (the front group AF side as illustrated in FIG. 1) while causing the diverging the light to proceed backward (to the front group BF side as illustrated in FIG. 1). In the first prism AN, the light from the front group AF that has been incident on the incident surface AP1a is reflected by the reflecting surface AP1c to the left at 90°. Thus, the reflected light exits the first prism AP1 through the exit surface AP1b. The variable aperture stop AS adjusts the amount (amount of light) of transmission of the light from the subject reflected by the first prism AP1. In the second prism AP2, the light from the subject, the amount of which has been adjusted by the variable aperture stop AS and which has entered through the incident surface AP2a, are reflected by the reflecting surface AP2c downward at an angle of 90 degrees and exits through the reflecting surface AP2b. The light from the subject that has been reflected by the second prism AP2 is converged by the rear group AR while proceeding downward. In the third prism AP3, the light from the rear group AR that has been incident on the incident surface AP3a is reflected by the reflecting surface AP3c to the right at 90°. Thus, the reflected light exits the third prism AP3 through the exit surface AP3b, and an image of the light is formed on the imaging plane of the image sensor AI (one of the image sensors). Each of the front group AF and the rear group AR includes a plurality of lenses. The lens closest to the object side (subject side) of the front group AF is a first lens L1.

In the wide-angle lens system B (the other optical system), the front group BF diverges light from an object (subject) that has entered the front group BF from the back side (the front group BF side as illustrated in FIG. 1) while causing the diverging the light to proceed forward (to the front group AF side as illustrated in FIG. 1). In the first prism BP1, the light from the front group BF that has been incident on the incident surface BP1a is reflected by the reflecting surface BP1c to the right at an angle of 90°. Thus, the reflected light exits the first prism BP1 through the exit surface BP1b. The variable aperture stop BS adjusts the amount (amount of light) of transmission of the light reflected by the first prism BM. In the second prism BP2, the light from the subject, the amount of which has been adjusted by the variable aperture stop BS and which entered through the incident surface BS2a, are reflected by the reflecting surface BP2c downward at an angle of 90° to exit through the exit surface BP2b. The rear group BR converges the light reflected by the second prism BP2 while causing the converging light to proceed downward. In the third prism BP3, the light from the rear group BR that has been incident on the incident surface BP3a is reflected by the reflecting surface BP3c to the left at an angle of 90°. Thus, the reflected light exits the third prism BP3 through the exit surface BP3b, and an image of the light is formed on the imaging plane of the image sensor BI (the other image sensor). Each of the negative front group BF and the positive rear group BR includes a plurality of lenses. The lens closest to the object side (subject side) of the front group BF is a first lens L1.

In the wide-angle lens system A, the imaging plane of the image sensor AI faces the left. In the wide-angle lens system B, the imaging plane of the image sensor BI faces the right. The back faces (the opposite plane of each imaging plane) of image sensors AI and BI face in opposite directions.

In each of the wide-angle lens system A and the wide-angle lens system B, the optical axes of the front groups AF and BF are defined as the optical axis X1 (optical axis of incident light/incident optical axis). The optical axis of the optical path from the reflecting surface AP1c/BP1c of the first prism AP1/BP1 to the reflecting surfaces AP2c/BP2c of the second prism AP2/BP2 is defined as the optical axis X2. The optical axes of the rear groups AR and BR are defined as the optical axis X3. The optical axis of the optical path from the reflecting surface AP3c/BP3c of the third prism AP3/BP3 to the image sensor AI/BI is defined as the optical axis X4. The wide-angle lens system A and the wide-angle lens system B are arranged such that the optical axes X1 are coaxially positioned and oriented in the front-to-back direction. Further, the front group AF and the front group BF are arranged to be symmetrical about a predetermined plane (a virtual plane between opposed lenses (the front lenses AF and BF of the wide-angle lens systems A and B)) perpendicular to the optical axis X1 along the front-to-back direction.

In the wide-angle lens systems A and B, the first prisms AP1 and BP1, which has the same specifications (common parts having the same specifications such as shape, material, and optical performance), are arranged close to each other along the optical axis X1. The first prisms AP1 and BP1 are combined so as to occupy substantially the same area in the front-to-back direction. In the first prisms AP1 and BP1, the reflecting surfaces AP1c and BP1c, which are parallel to each other, are close to each other in the front-to-back direction along the optical axes X1, facing each other. That is, the first prism AP1 and the first prism BP1 are opposed to each other such that the back surface of the reflecting surface AP1c faces the back surface of the reflecting surface BP1c. With the combined lens barrel 10 completely assembled, a holding structure of the first prisms AP1 and BP1 is provided such that a clearance CL (see FIGS. 3 and 4) of a predetermined width is disposed between the reflecting AP1c and the reflecting surface BP1c.

More specifically, as illustrated in FIG. 3B, Z1 denotes the length of each of the first prisms AP1 and BP1 in the front-to-back direction (from the incident surface AP1a/BP1a to the edge line formed by the exit surface AP1b/BP1b and the reflection surfaces AP1c and BP1c), and Z2 denotes the total length of the first prisms AP1 and BP1 in the front-to-back direction (from the incident surface AP1a to the incident surface BP1a. In this case, Z2 is greater than Z1 due to the presence of the clearance CL. However, as the clearance CL is much smaller than the length Z1 of each of the first prisms AP1 and BP1 in the front-to-back direction, the total length Z2 of the first prisms AP1 and BP1 is substantially equal to the length Z1 of each of the first prisms AP1 and BP1 in the front-to-back direction. However, there may not be a clearance between the reflecting surface AP1c of the first prism AP1 and the reflecting surface BP1c of the first prism BP1. Alternatively, the reflecting surface AP1c of the first prism AP1 may be in contact with the reflecting surface BP1c of the first prism BP1. In such a case, the reflecting surface AP1c merely contacts the reflecting surface BP1c, which means that the first prisms AP1 and BP1 are not holding each other.

The optical axes X2, X3 and X4 of the wide-angle lens system A and the optical axes X2, X3, and X4 of the wide-angle lens system B are located within the plane between opposed lenses (that is, within the opposed planes). More specifically, the optical axis X2 of the wide-angle lens system A and the optical axis X2 of the wide-angle lens system B are coaxially positioned and oriented in the right-to-left direction. Further, the optical axis X4 of the wide-angle lens system A and the optical axis X4 of the wide-angle lens system B are coaxially positioned and oriented in the right-to-left direction. Further, the optical axis X3 of the rear group AR and the optical axis X3 of the rear group BR are spaced apart in the right-to-left direction in parallel to each other.

As described above, by bending the optical path in different directions multiple times within the plane between opposed lenses of the wide-angle lens systems A and B, a long optical path length of the wide-angle lens systems A and B can be obtained. Further, the first prisms AP1 and BP1 are close to each other within the wide-angle lens systems A and B configured to be a folded optical system. Such a configuration can reduce the distance (the distance between maximum angle-of-view points) between the positions at which the light rays forming a maximum angle of view enter the lenses closest to the object side (the first lenses L1 of the front groups AF and BF) in the wide-angle lens systems A and B. The distance between maximum angle-of-view points is illustrated in FIG. 1. As a result, the size of the image sensors AI and BI can be increased and the size of the imaging system 1 can be reduced. Further, the disparity that corresponds to the amount of an overlapping area of two images to be joined by calibration is reduced, thus obtaining high-quality images. Unlike the present embodiment, the disparity might increase as the positions at which the light from the subject is incident on the two optical systems are away from each other. Thus, high-quality combined images are more likely difficult to obtain.

The combined lens barrel 10 is configured by combining a lens barrel 11A supporting the wide-angle lens system A and the image sensor AI, and the lens barrel 11B supporting the wide-angle lens system B and the image sensor BI. The lens barrel 11A and the lens barrel 11B have the same shape (structure), and are symmetrical along the front-to-back direction to be combinable. With reference to the figures following FIG. 6, the lens barrels 11A and 11B are described in detail. Identical constituent elements of the lens barrel 11A and the lens barrel 11B are denoted by the same reference numerals. In each of the lens barrels 11A and 11B, the object side is the front side, and the opposite side of the object side is the back side of the front-to-back direction along the optical axis X1 (of the imaging system 1). The front (object side) of the lens barrel 11A faces the front side and the back of the lens barrel 11A faces the back side of the front-to-back direction of the imaging system 1. The front (object side) of the lens barrel 11B faces the back side and the back of the lens barrel 11B faces the front side of the front-to-back direction of the imaging system 1.

Each of the lens barrel 11A and the lens barrel 11B according to the embodiments of the present disclosure is an imaging unit that includes an image-forming optical system (wide-angle lens system A/B) and image sensor (AI/BI) and is capable of independently capturing an image of an object. In each of the lens barrels 11A and 11B, the image-forming optical system (wide-angle lens system A/B) and the members (for example, a base frame 12, a front group frame 13 (an adhesive fixing member), a rear group frame 14, a third prism frame 15 to be described below) directly or indirectly supporting (holding) the image-forming optical system constitute the optical system.

Each of the lens barrels 11A and 11B has the base frame 12, the front group frame 13, the rear group frame 14, the third prism frame 15, and an image sensor unit 16. Each of the base frame 12, the front group frame 13, the rear group frame 14, and the third prism frame 15 is formed as a molded product made of, for example, plastic.

In the lens barrel 11A, the base frame 12 (a first holding body) holds the first prism AP1, the variable aperture stop AS, and the second prism AP2. The front group frame 13 holds the front group AF. The rear group frame 14 holds the rear group AR. The third prism frame 15 holds the third prism AP3. The image sensor unit 16 is formed by combining, for example, the image sensor AI and the substrate 17.

In the lens barrel 11B, the base frame 12 (a second holding body) holds the first prism BP1, the variable aperture stop BS, and the second prism BP2. The front group frame 13 holds the front group BF. The rear group frame 14 holds the rear group BR. The third prism frame 15 holds the third prism BP3. The image sensor unit 16 is formed by combining, for example, the image sensor BI and the substrate 17.

As illustrated in FIGS. 12 to 16, the base frame 12 includes a front wall 20, an upper wall 21 positioned at the upper portion of the front wall 20, and side walls 22 and 23 respectively positioned at the left and right edges of the front wall 20. The corner wall 24 is provided near the boundary of the upper wall 21 and the side wall 22 and the corner wall 25 is provided near the boundary of the upper wall 21 and the side wall 23.

Figure 13:
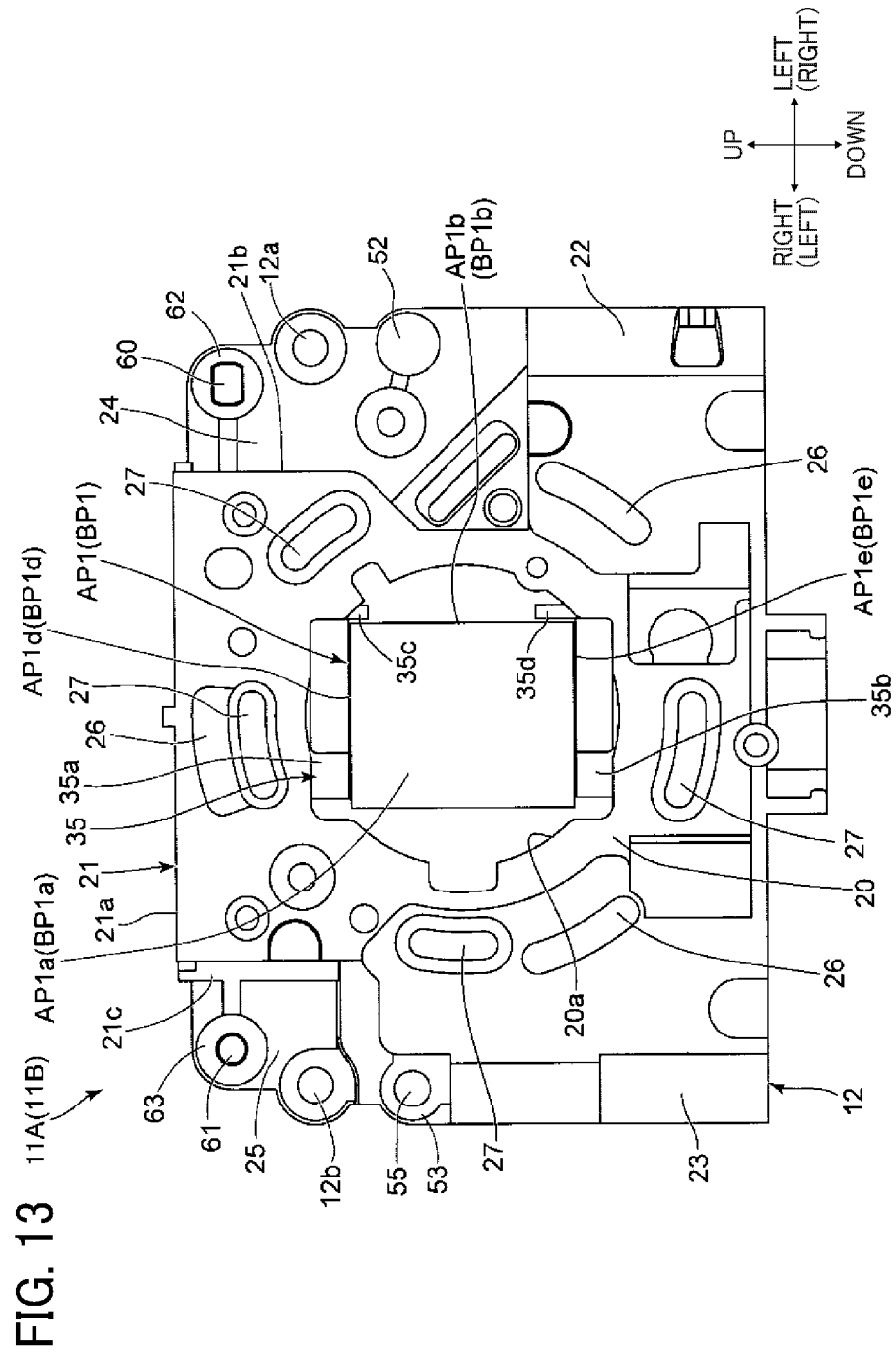
FIG. 13 is a front view of the base frame and the first prism.

The front wall 20 has a front opening 20a penetrating the front wall 20 in the front-to-back direction and substantially faces an object. The optical axis X1 passes through substantially the center of the front opening 20a. As illustrated in FIG. 13, the front wall 20 further has a plurality of front group frame contacts 26 (three in the present embodiment) positioned around the front opening 20a on the front side of the front wall 20. Each of the front group frame contacts 26 is a protrusion provided perpendicular to the optical axis X1, protruding forward in the front-to-back direction.

The front wall 20 further has a plurality of bonding holes 27 (four in the present embodiment) around the front opening 20a. Each of the bonding holes 27 is an elongated hole whose direction is oriented in the circumferential direction around the optical axis X1, penetrating the front wall 20 in the front-to-back direction.

A contact on the back of the front group frame 13 comes into contact with each front group frame contact 26 of the base frame 12 so that the front group frame 13 is positioned relative to the base frame 12 in the front-to-back direction. In this state, a part of the front group frame 13 enters the front opening 20a. The position of the front group frame 13 can be adjusted (optically adjustable) relative to the base frame 12 in a direction perpendicular to the optical axis X1. After the position adjustment, the bonding hole 27 is filled with adhesive, and the front group frame 13 is attached to the base frame 12 with adhesive.

The upper wall 21 extends from the upper edge of the front wall 20 to the back side of the combined lens barrel 10, and has a top portion 21a (top portions of the lens barrels 11A and 11B and a pair of side portions 21b and 21c that extend from right and left edges of the top portion 21a to the down side of the combined lens barrel 10. The upper wall 21 forms a U shape defined by the top portion 21a in the upper side and the side portions 21b and 21c in the right and left sides of the upper wall 21 in which the down side is open.

The side wall 23 and the side wall 22 are disposed below the upper wall 21 and extend from the right and left side edges to the back side of the front wall 20, respectively. Each of the area that ranges from the front wall 20 to the side wall 22 and the area that ranges from the front wall 20 to the side wall 23 forms a curve shape that outlines the rear group frame 14 to be described later.

Each of the corner wall 24 and the corner wall 25 faces opposite directions in substantially the front-to-back direction, and is displaced to the back side relative to the front wall 20. The corner wall 24 projects laterally from the side portion 21b of the upper wall 21, and the lower end of the corner wall 24 is connected to the upper portion of the side wall 22. The corner wall 25 projects laterally from the side portion 21c of the upper wall 21, and the lower end of the corner wall 25 is connected to the upper portion of the side wall 23. The corner wall 24 and the corner wall 25 are connected to a plurality of walls that extend in different directions, which increases the supporting strength so as to prevent deformation of the corner walls 24 and 25.

The base frame 12 further includes a first prism holder (a holder) 35 and a second prism holder 36 on the back surface of the front wall 20. The first prism holder 35 serves to hold the first prism AP1 or the first prism BP1 on the back of the front opening 20a. The second prism holder 36 serves to hold the second prism AP2 or the second prism BP2.

The first prism holder 35 has an upper wall 35a on the upper edge side of the front opening 20a and a lower wall 35b on the lower edge side of the front opening 20a. The upper wall 35a and the lower wall 35b are not closed and open in the front-to-back direction, which means that the opening 20 has a through-hole structure along the front-to-back direction. On one end of the upper wall 35a in the right-to-left direction, a vertical wall 35c is formed to project downward. On the other end of the lower wall 35b in the right-to-left direction, a vertical wall 35d is formed to project upward. There is a gap between the vertical wall 35c and the vertical wall 35d up-to-down direction. A bonding recessed portion 35e that opens downward is formed at a position closer to the vertical wall 35c in the upper wall 35a, and a bonding recessed portion 35f that opens upward is formed at a position closer the vertical wall 35d in the lower wall 35b.

The first prisms AP1 and BP1 are disposed inside the first prism holder 35 surrounded by the upper wall 35a, the lower wall 35b, the vertical wall 35c, and the vertical wall 35d. The upper wall 35a faces the upper side surfaces AP1d and BP1d of the first prisms AP1 and BP1, and the lower wall 35b faces the lower side surfaces AP1e and BP1e of the first prisms AP1 and BP1. Further, the vertical wall 35c faces an upper end portion of the exit surfaces AP1b and BP1b of the first prisms AP1 and BP1, and the vertical wall 35d faces a lower end portion of the exit surfaces AP1b and BP1b of the first prisms AP1 and BP1. Most portions of the exit surfaces AP1b and BP1b except for the upper end portion and the lower end portion are exposed from the gaps between the vertical walls 35c and 35d (see FIG. 16). There is a slight clearance between each of the walls 35a, 35b, 35c, 35d and the first prism AP1/BP1, and the first prisms AP1 and BP1 are adjustable within the range of the clearance. The first prisms AP1 and BP1 are positioned using the positioning tool (which is to be described in detail later) before injecting the adhesive into the bonding recessed portions 35e and 35f. Then, the first prisms AP1 and BP1 are attached to the first prism holder 35 with adhesive.

The first prisms AP1 and BP1 are held by the first prism holder 35 by bonding of the upper wall 35a and the side surfaces AP1d and BP1d, and bonding of the lower wall 35b and the side surfaces AP1e and BP1e. With the bonding recessed portions 35e and 35f formed on the portions of the upper wall 35a and the lower wall 35b, injecting the adhesive into the bonding recessed portions 35e and 35f enables the adhesive to spread along the lower surface side of the upper wall 35a and the upper surface side of the lower wall 35b, which ensures that the first prisms AP1 and BP1 are attached to and held by the lens barrels 11A and 11B.

The bonding recessed portions 35e and 35f are provided closer to the vertical walls 35c and 35d in the right-to-left direction, respectively and the adhesive injected into the bonding recessed portions 35e and 35f partially enters the vertical walls 35c and 35d, respectively. Then, the holding of the first prisms AP1 and BP1 involves the adhesive that has entered a clearance between the upper end portion of each of the exit surface AP1b and BP1b and the vertical wall 35c, or a clearance between the lower end portion of each of the exit surface AP1b and BP1b and the vertical wall 35d.

As described above, the holding of the first prisms AP1 and BP1 by the first prism holder 35 includes, but not limited to, holding the first prisms AP1 and BP1 by the first prism with adhesive. Further, the first prisms AP1 and BP1 are attached to the base frame 12 with adhesive. However, no limitation is intended thereby. For example, a prism holder that holds the side surfaces AP1d and AP1e of the first prism AP1 and the side surfaces BP1d and BP1e of the first prism BP1 can be provided, and the prism holder may be attached to the base frame 12 with adhesive or may be screwed to the base frame 12. The prism holder has a shape in which the reflecting surfaces AP1c and BP1c of the first prisms AP1 and BP1 are exposed without any covering. Such a configuration is also included in the holding of the reflective optical element in the embodiments of the present disclosure.

The side surfaces AP1d and BP1d and the side surfaces AP1e and BP1e are located on the sides (the upper side and the lower side) of the optical path from the incident surfaces AP1a and BP1a to the exit surfaces AP1b and BP1b in the first prisms AP1 and BP1. With such an arrangement, the holding of the side surfaces AP1d and BP1d and the side surfaces AP1e and BP1e via the upper wall 35a and the lower wall 35b does not block the light coming from the subject, which means that the optical performance is unaffected by such a holding structure. Further, the vertical walls 35c and 35d are located outside (the upper side and the lower side) the effective diameter through which the light from the subject for forming an image passes within the exit surfaces AP1b and BP1b, which has no adverse effect on the optical performance. Increasing the thickness of each portion of the first prism holder 35 so as to increase the rigidity does not increase the size in the front-to-back direction. Accordingly, the first prisms AP1 and BP1 can be firmly and stably held with a great space efficiency in the front-to-back direction. That is, the first prisms AP1 and BP1 can be held with high accuracy by the first prism holder 35 without impairing the optical performance.

As described above, the first prism holder 35 is disposed on the base frame 12 to hold the held part (the side surfaces AP1c, BP1c, AP1d, BP1e on the both sides and a portion of each of the exit surfaces AP1b and BP1b) at a different position from the reflecting surfaces AP1c and BP1c on the first prisms AP1 and BP1, and the back side of the two reflecting surfaces AP1c and BP1c are exposed without a covering (see FIGS. 11 to 15). With this configuration, the two reflecting surfaces AP1c and BP1c can be disposed close to each other without obstruction of the structure of the lens barrels 11A and 11B including the base frame 12. Accordingly, in the combined lens barrel 10 completely assembled, the first prisms AP1 and BP1 are disposed closed to each other to a degree that the first prisms AP1 and BP1 occupy substantially the same area in the front-to-back direction therewithin, so that the total length Z2 (see FIG. 3B) of the first prisms AP1 and BP1 in the front-to-back direction can be reduced.

Figure 16:
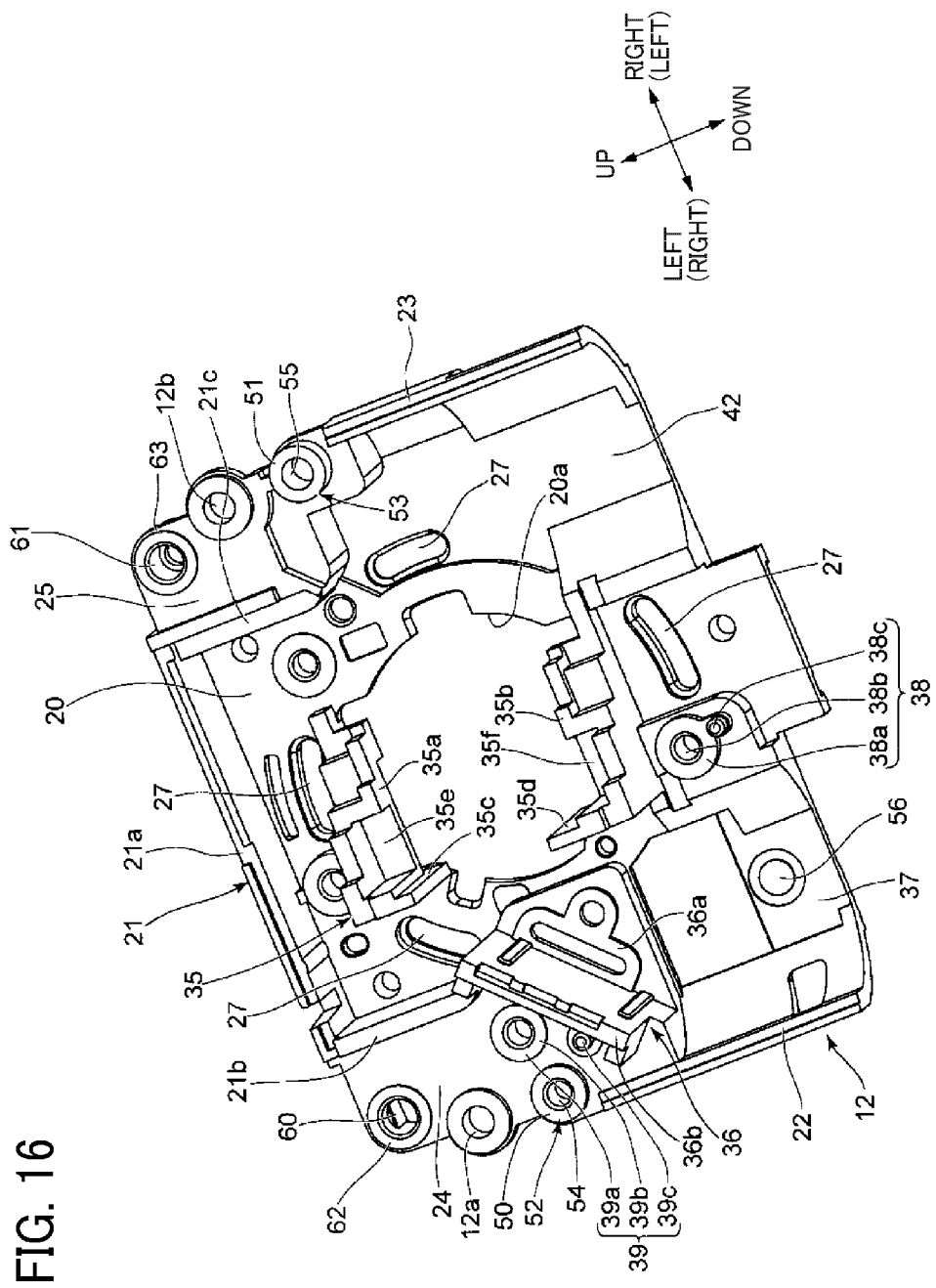
FIG. 16 is a perspective view of the base frame with the first prism and the second prism removed, as viewed from the back side.

As illustrated in FIG. 16, the second prism holder 36 is disposed below the side portion 21b of the upper wall 21 and the corner wall 24, and includes a support seat 36a facing the back side of the combined lens barrel 10 and a support wall 36b that projects from the support seat 36a to the back side of the combined lens barrel 10. The side surfaces AP2d and BP2d of the second prisms AP2 and BP2 contact the support seat 36a. The reflecting surfaces AP2c and BP2c of the second prisms AP2 and BP2 contact the support wall 36b. The second prisms AP2 and BP2 are positioned in the direction along the reflecting surfaces AP2c and BP2c, using the positioning tool. Then, the positioned second prisms AP2 and BP2 are bonded (fixed) to the second prism holder 36 with adhesive.

Figure 12:
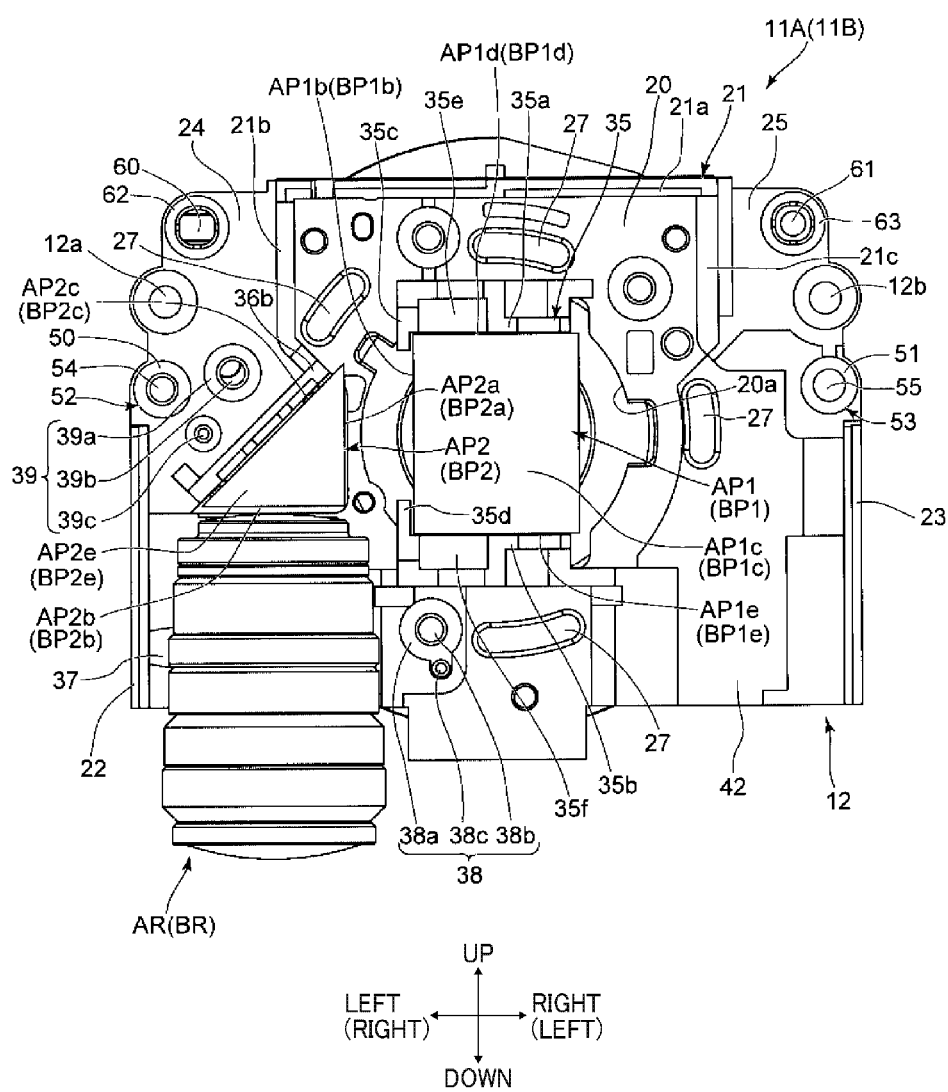
FIG. 12 is a rear view of a base frame and an imaging optical system constituting one of the two separate lens barrels in FIG. 7.
Figure 14:
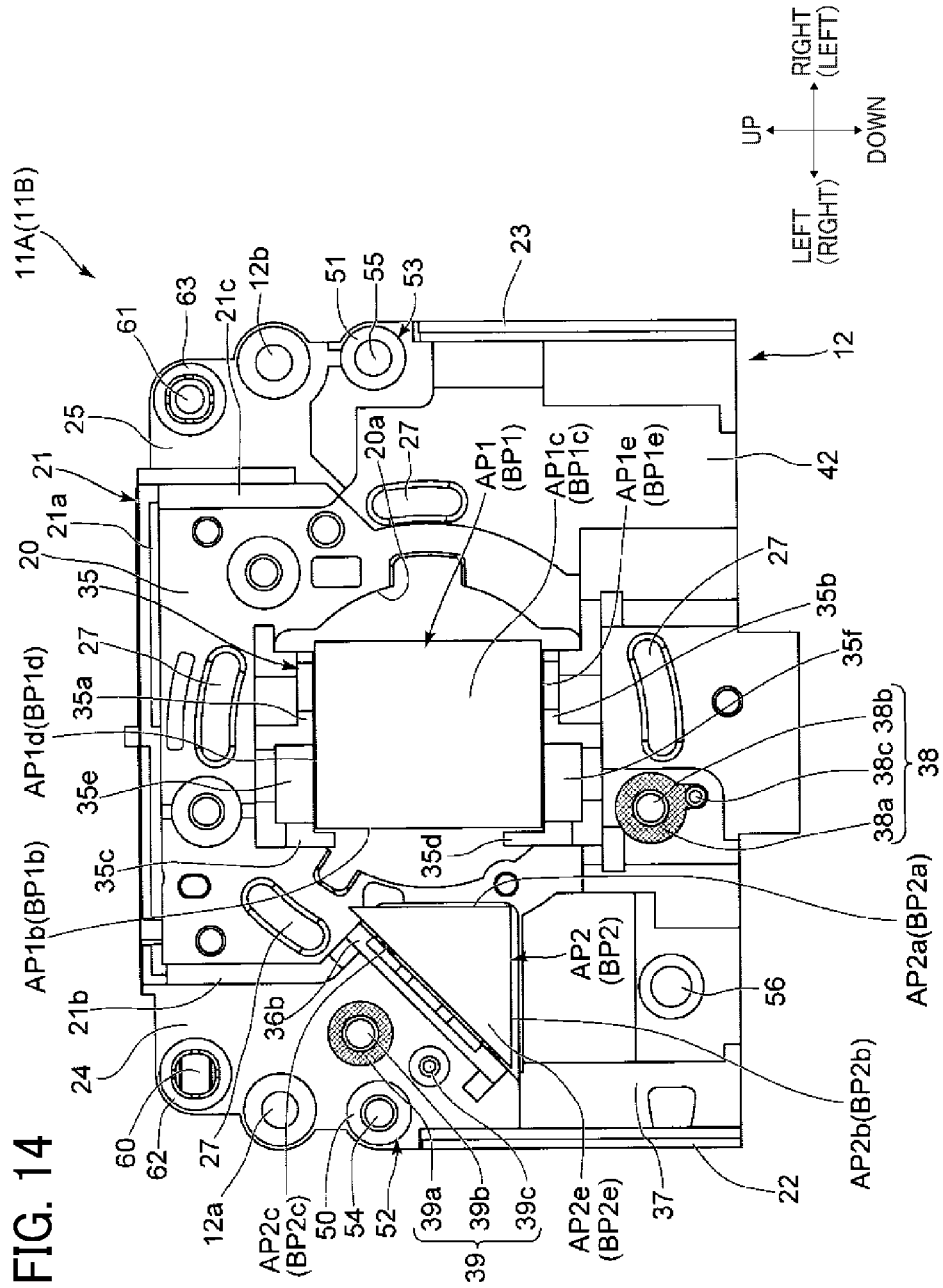
FIG. 14 is a rear view of the base frame, the first prism, and a second prism.
Figure 15:
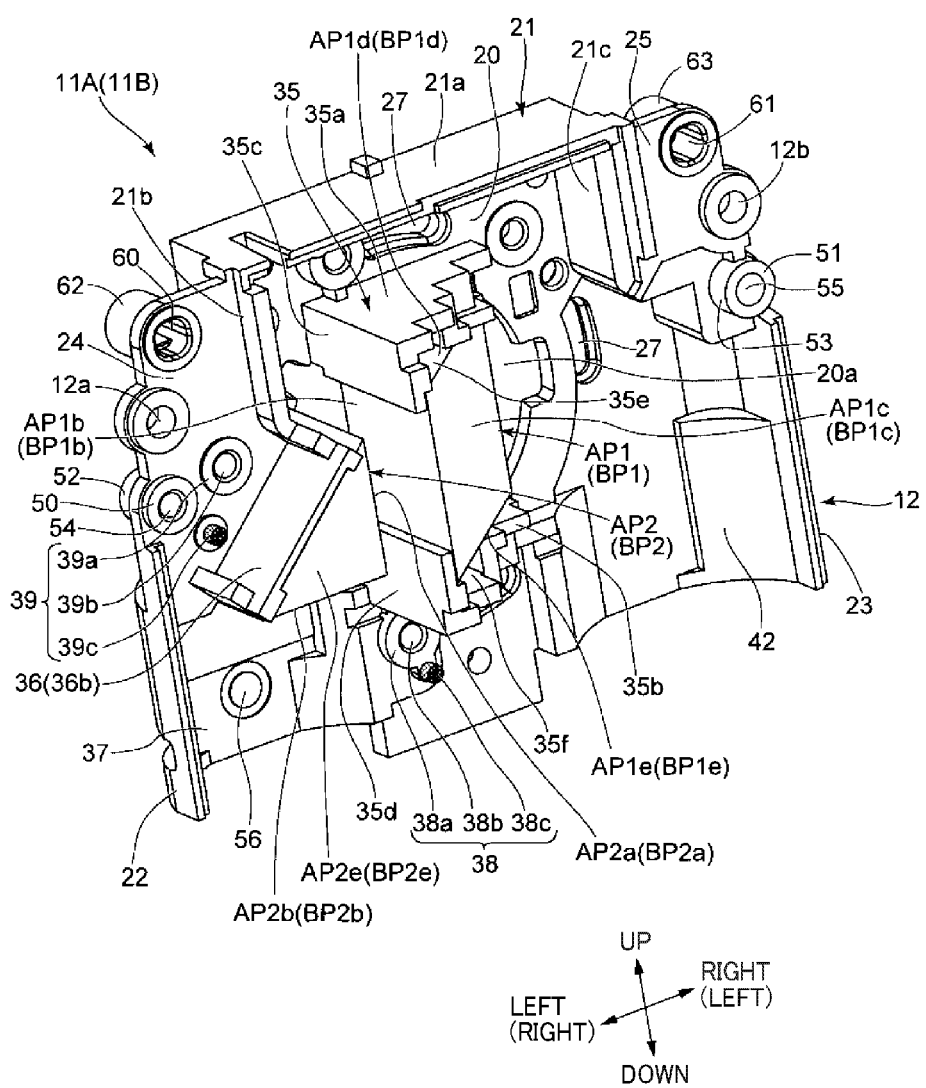
FIG. 15 is a perspective view of the base frame, the first prism, and the second prism as viewed from the back side.

The base frame 12 in a state where the first prisms AP1 and BP1 and the second prisms AP2 and BP2 are held is illustrated in FIGS. 14 and 15. FIG. 12 indicates the position of each of the rear groups AR and BR being held by the base frame 12 using the rear group frame 14, in addition to the first prism AP1 and BP1.

Figure 10:
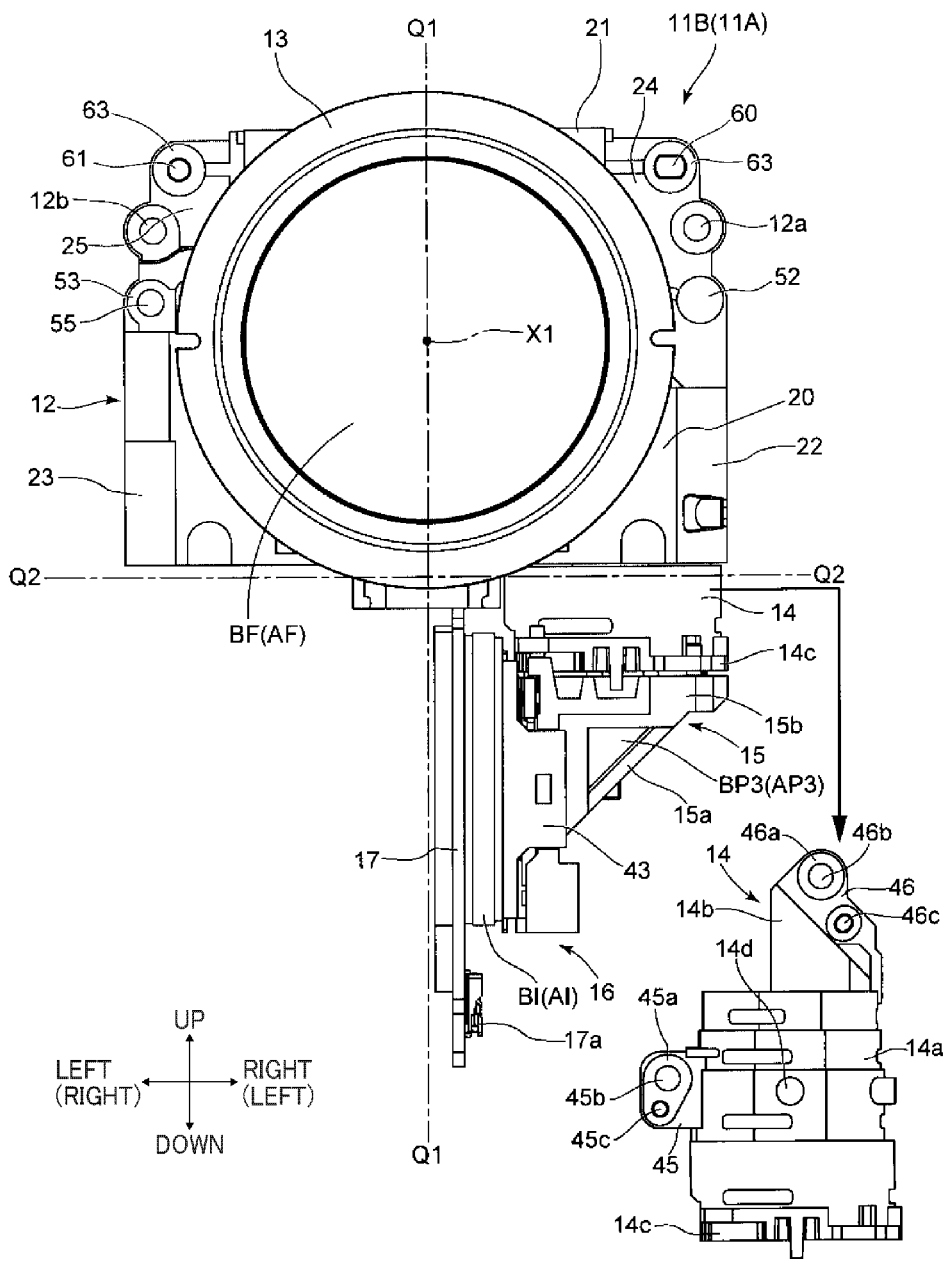
FIG. 10 is a front view of one of the two separate lens barrels in FIG. 7.

FIG. 10 is an illustration of the rear group frame 14 alone without the base frame 12 attached. The rear group frame 14 has a substantially cylindrical portion 14a centering on the optical axis X3 extending in the vertical direction, and a plurality of lenses constituting the rear group AR or the rear group BR are formed on the cylindrical portion 14a. Fixedly supported inside. The rear group frame 14 further includes a prism cover 14b on the upper portion of the cylindrical portion 14a. A support tab 45 projects laterally from the cylindrical portion 14a, and a support tab 46 projects upward from the prism cover 14b. A joining flange 14c is formed at the lower end of the cylindrical portion 14a. On the front side of the rear group frame 14, opposing convex portions 14d are formed on the side of the support tab 45 and below the support tab 46.

As illustrated in FIG. 10, the support tab 45 in the rear group frame 14 is provided with a contact 45a, a through hole 45b, and a positioning hole 45c. The support tab 46 is provided with a contact 46a, a through hole 46b, and a positioning hole 46c. Each of the contacts 45a and 46a is provided with an annular plane perpendicular to the optical axis X1 on a convex part projecting to the front side. Each of the through holes 45b and 46b penetrates through the center of each of the contacts 45a and 46a in the front-to-back direction. Each of the positioning holes 45c and 46c is a hole that is open to the front side. The positioning hole 45c is a round hole, and the positioning hole 46c is an elongated hole.

As illustrated in FIGS. 14 to 16, on the back side of the base frame 12, a rear group frame holder 37 (lens positioner) is formed below the corner wall 24 and the second prism holder 36. The rear group frame holder 37 is a concave portion surrounded by the front wall 20 and the side wall 22 and has a shape that enables substantially half (portion positioned on the front side) of the cylindrical portion 14a of the rear group frame 14 to be accommodated within the rear group frame holder 37. The prism cover 14b covers a part of the second prisms AP2 and BP2 held by the second prism holder 36 of the base frame 12 with the cylindrical portion 14a accommodated in the rear group frame holder 37.

A rear group positioner (a lens positioner) 38 is disposed on the side of the rear group frame holder 37 (below the lower wall 35b of the first prism holder 35), and a rear group positioner 39 (another lens positioner) is disposed above the second prism holder 36. The rear group positioners 38 and 39 respectively have annular planes 38a and 39a perpendicular to the optical axis X1, and screw holes are formed in the center of each annular plane. The annular planes 38a and 39a face the back side of the base frame 12. The rear group positioners 38 and 39 are further provided with positioning projections 38c and 39c that project toward the back side.

With the cylindrical portion 14a of the rear group frame 14 accommodated in the rear group frame holder 37, the rear group frame 14 is positioned relative to the base frame 12 by the support tab 45 and the rear group positioner 38, and the support tab 46 and the rear group positioner 39. More specifically, the contact 45a contacts with the annular plane 38a, and the contact 46a contacts the annular plane 39a, so that the rear group frame 14 is positioned along the optical axis X1 in the front-to-back direction. Further, the positioning projection 38c is inserted into the positioning hole 45c, and the positioning projection 39c is inserted into the positioning hole 46c, so that the rear group frame 14 is positioned in a direction (the up-and-down direction and right-to-left direction) perpendicular to the optical axis X1. In positioning in a direction perpendicular to the optical axis X1, the positioning hole 45c, which is a round hole, serves as a main reference. The positioning hole 46c, which is an elongated hole, allows a movement relative to the positioning projection 39c in the longitudinal direction of the positioning hole 46c while restricting a movement relative to the positioning projection 39c in the direction of rotation around the positioning hole 45c. Accordingly, the positioning hole 46c serves to determine a sub-reference position to cancel out the variation in the assembly accuracy between the base frame 12 and the rear group frame 14.

With the rear group frame 14 positioned with respect to the base frame 12, the screw 40 (FIG. 11) is screwed into the screw hole 38b of the rear group positioner 38 through the through hole 45b of the support tab 45, and the screw 41 (FIG. 11) is screwed into the screw hole 39b of the rear group positioner 39 through the through hole 46b of the support tab 46. By tightening the screw 40 and the screw 41, the rear group frame 14 is positioned and fixed to the base frame 12

On the back side of the base frame 12, a rear group frame accommodating section 42 (a lens accommodating section) is formed below the corner wall 25. The rear group frame accommodating section 42 is a recessed portion surrounded by the front wall 20 and the side wall 23 and has a shape that enables substantially half (portion positioned on the back side) of the cylindrical portion 14a of the rear group frame 14 to be accommodated within the rear group frame accommodating section 42. Prior to combining the lens barrel 11A and the lens barrel 11B, the rear group frame accommodating section 42 is an empty space (see FIGS. 7 and 11). When the lens barrel 11A and the lens barrel 11B are combined, the rear group frame holder 37 of one base frame 12 and the rear group frame accommodating section 42 of the other base frame 12 face each other in the front-to-back direction, so as to form space to accommodate the cylindrical 14a of the rear group frame 14 inside the combination of the lens barrel 11A and the lens barrel 11B.

The third prism frame 15 includes a prism support wall 15a (see FIG. 11) that supports the side surfaces AP3d and AP3e, BP3d and BP3e on the both sides of the third prisms AP3 and BP3, and the reflecting surfaces AP3c and AP3c. Each of the third prisms AP3 and BP3 is attached to the third prism frame 15 with adhesive. On the upper portion of the third prism frame 15, a joining flange 15b is provided. The joining flange 15b can be fitted into the joining flange 14c of the rear group frame 14 from below. With the joining flange 15b fitted to the joining flange 14c, the third prism frame 15 is positioned and fixed to the rear group frame 14 with adhesive.

The image sensor unit 16 is provided with a pair of fitting pieces 43 at the edge in the front-to-back direction. The pair of fitting pieces 43 are fitted into the recesses formed in the prism support wall 15a of the third prism frame 15, which positions the image sensor unit 16 relative to the third prism frame 15. The image sensor unit 16 is fixed to the third prism frame 15 with adhesion. With such a state, the imaging planes of the image sensors AI and BI face in a direction perpendicular to the optical axis X4. Further, the imaging plane of the image sensor AI faces the exit surface AP3b of the third prism AP3, and the imaging plane of the image sensor BI faces the exit surface BP3b of the prism BP3.

The image sensor unit 16 includes a substrate 17 having image sensors AI and BI on one side. The substrate 17 is substantially rectangular. With the image sensor unit 16 bonded to the third prism frame 15, the long direction of the substrate 17 is along the up-and-down directions, and the lateral direction of the substrate 17 is along the front-to-back direction of the imaging apparatus 80. Further, the direction of thickness of the substrate 17 is along right-to-left direction. In the vicinity of the lower end of the substrate 17, a connector 17a to be connected to the control circuit of the imaging apparatus 80 is disposed. The connector 17a is disposed on the side of the substrate 17 on which the image sensors AI and BI are provided.

In the lens barrels 11A and 11B according to the embodiment, the base frame 12 does not directly hold the reflecting surfaces AP1 and BP1 to hold the first prisms AP1 and BP1. In holding of the first prisms AP1 and BP1, the base frame 12 holds other portions other than the reflecting surfaces AP1c and BP1c. As described above, such a structure enables the reflecting surfaces AP1c and BP1c to be as much close to each other as possible along the optical axis X1. Since the position accuracy of the reflecting surfaces AP1c and BP1c is optically significant in the first prisms AP1 and BP1, positioning of the reflecting surfaces AP1c and BP1c with high precision is demanded even for the structure in which the base frame 12 does not directly hold the reflecting surfaces AP1c and BP1c.

Figure 8:
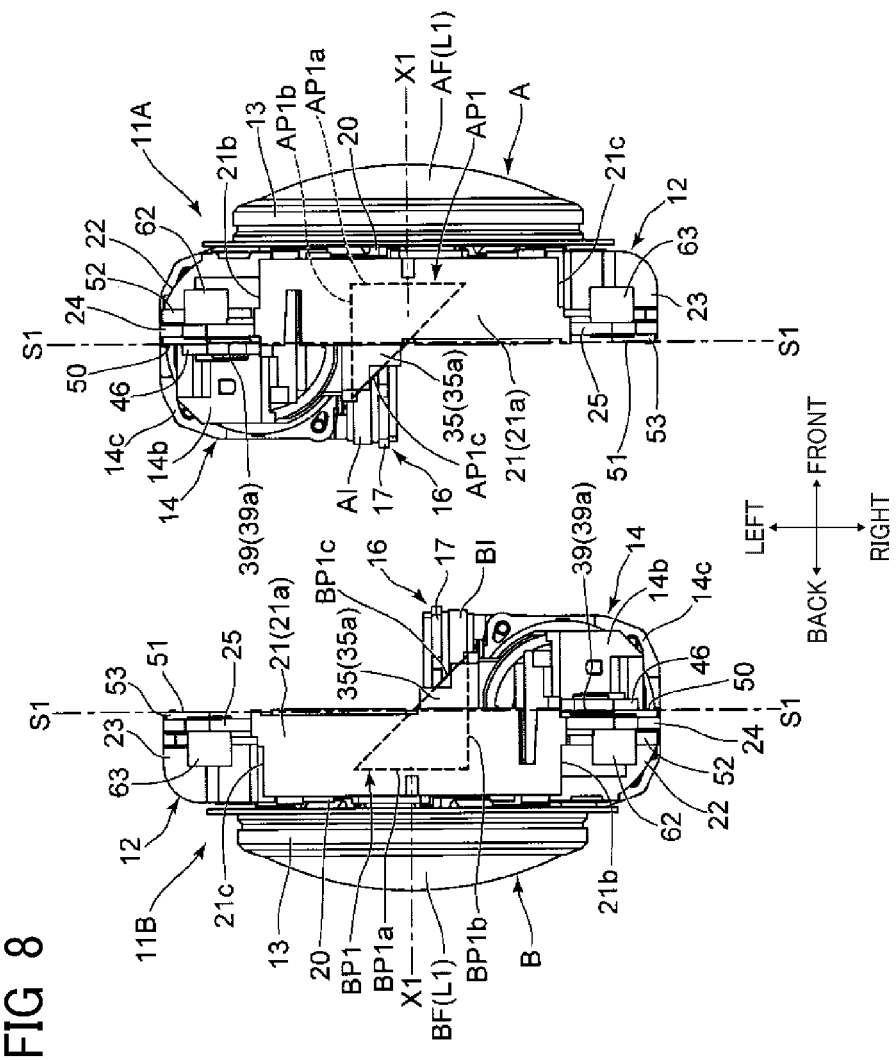
FIG. 8 is a top view of the two separate lens barrels in FIG. 7.
Figure 9:
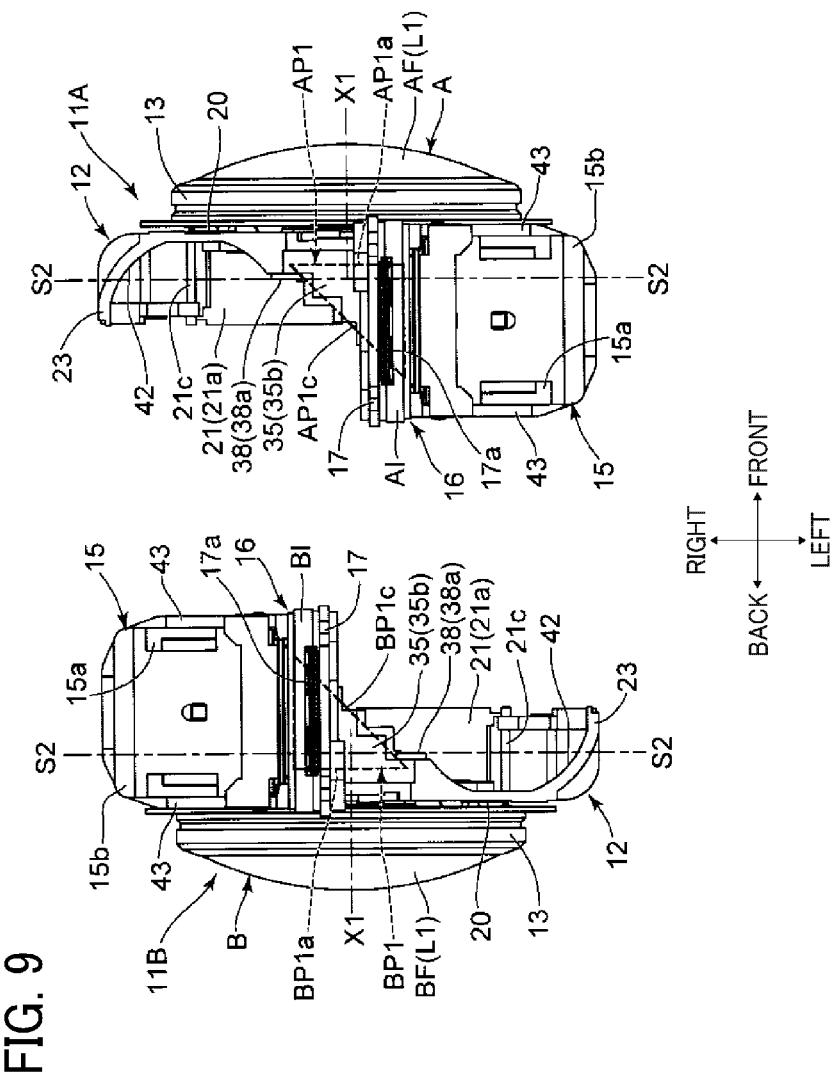
FIG. 9 is a bottom view of the two separate lens barrels in FIG. 7.

For example, the first prisms AP1 and BP1 are positioned using the rear group positioners 38 and 39 that serve to position the rear group frame 14 relative to the base frame 12. The rear group positioners 38 and 39 are located within a plane that intersects with the reflecting surfaces AP1c and BP1c of the first prisms AP1 and BP1 at an angle of 45° (a plane that intersects with the reflecting surfaces AP1c and BP1c and extends in a direction (the direction along the optical axis X2) at which the light is reflected by the reflecting surfaces AP1c and BP1c. More specifically, virtual planes S1 and S2 that intersect with the reflecting surfaces AP1c and BP1c at an angle of 45° are indicated in FIGS. 8 and 9. In the rear group positioners 38 and 39, the annular planes 38a and 39a and the virtual planes S1 and S2 are all perpendicular to the optical axis X1. The virtual plane S1 is a plane including the annular plane 39a, and the virtual plane S2 is a plane including the annular plane 38a. Further, the positioning projection 39c of the rear group positioner 39 is positioned crossing the virtual plane S1, and the positioning projection 38c of the rear group positioner 38 is positioned crossing the virtual plane S2.

An assembly jig is used to attach the first prisms AP1 and BP1 to the base frame 12. The assembly jig is provided with positioners (contact surfaces) that contacts the annular planes 38a and 39a of the rear group positioners 38 and 39 so as to determined the position of the base frame 12 in the front-to-back direction, and positioners (holes) that engage with the positioning projections 38c and 39c so as to determine the position of the base frame 12 in the up-to-down direction and the right-to-left direction. The assembly jig is further provided with a support surface to contact the reflecting surfaces AP1c and BP1c of the first prisms AP1 and BP1. The base frame 12 is attached to the assembly jig in a state of being positioned using the rear group positioners 38 and 39, and then the reflecting surfaces AP1c and BP1c are placed on the support surface of the assembly jig in a state of being positioned via the rear group positioners 38 and 39. Thus, the first prisms AP1 and BP1 are positioned. In particular, the positions of the first prisms AP1 and BP1 in the direction along the optical axis X1 are precisely determined. In this state, the adhesive is injected into the bonding recessed portions 35e and 35f of the first prism holder 35 so that the first prisms AP1 and BP1 are fixed to the base frame 12 at appropriate positions. Then, when the base frame 12 is removed from the assembly jig, the holding of the first prisms AP1 and BP1 is provided with the back side of the reflecting surfaces AP1c and BP1c exposed.

As described above, the base frame 12 is positioned with respect to the assembly jig with the rear group positioners 38 and 39 as a reference before the first prism AP1 and BP1 are attached to the base frame 12. Accordingly, the relative positions of the first prisms AP1 and BP1 and the rear groups AR and BR can be determined with a higher precision. Particularly, in each of the lens barrels 11A and 11B, by disposing the rear group positioners 38 and 39 within a plane (on the side of the reflecting surfaces AP1c and BP1c) intersecting with the reflecting surfaces AP1c and BP1c of the first prisms AP1 and BP1 at an angle of 45°, the positions of the reflecting surfaces AP1c and BP1c can be adjusted with a higher precision in attaching the base frame 12 to the assembly jig with the rear group positioners 38 and 39 as a reference. Accordingly, even the structure in which the base frame 12 does not directly hold the reflecting surfaces AP1c and BP1c provides a successful optical performance while holding the folded optical system including the reflecting surfaces AP1c and BP1c with a high precision.

Figure 7:
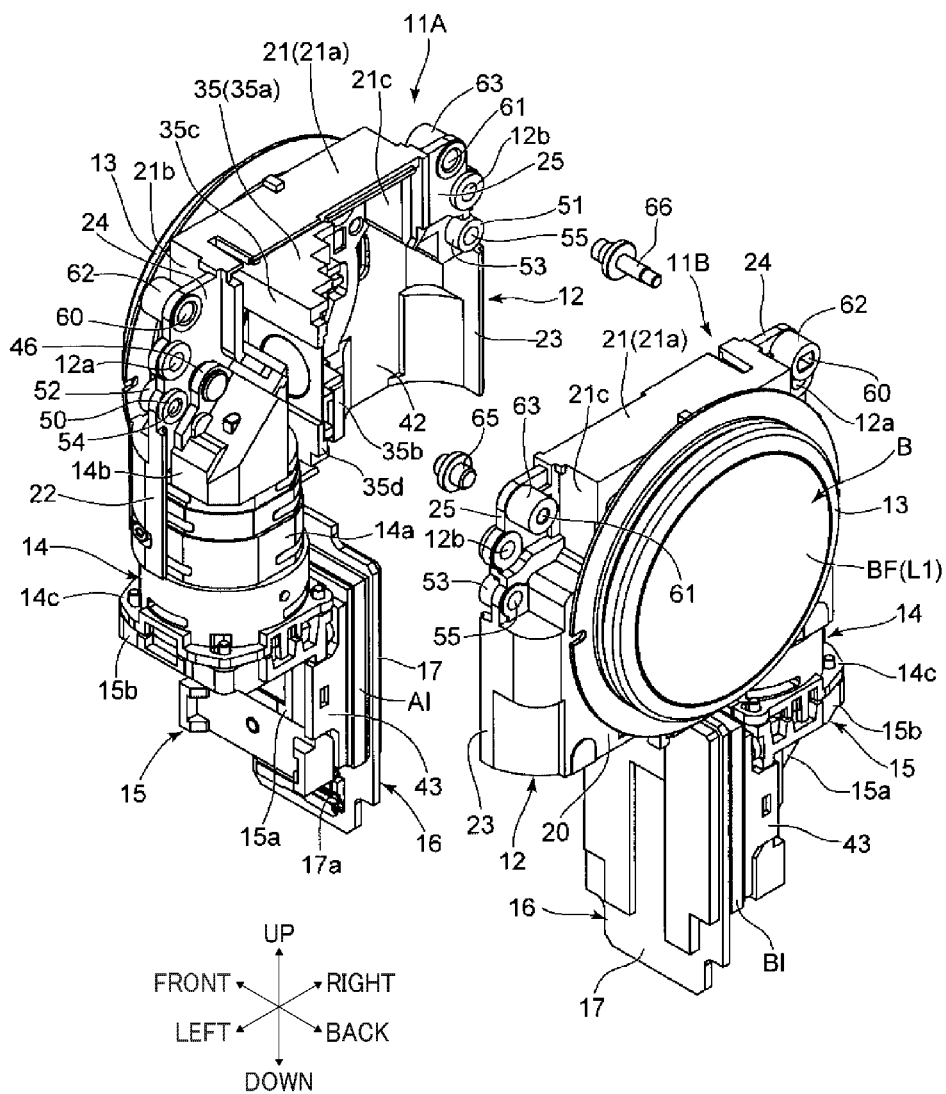
FIG. 7 is a perspective view of two separate lens barrels that constitute the combined lens barrel in FIG. 6.
Figure 11:
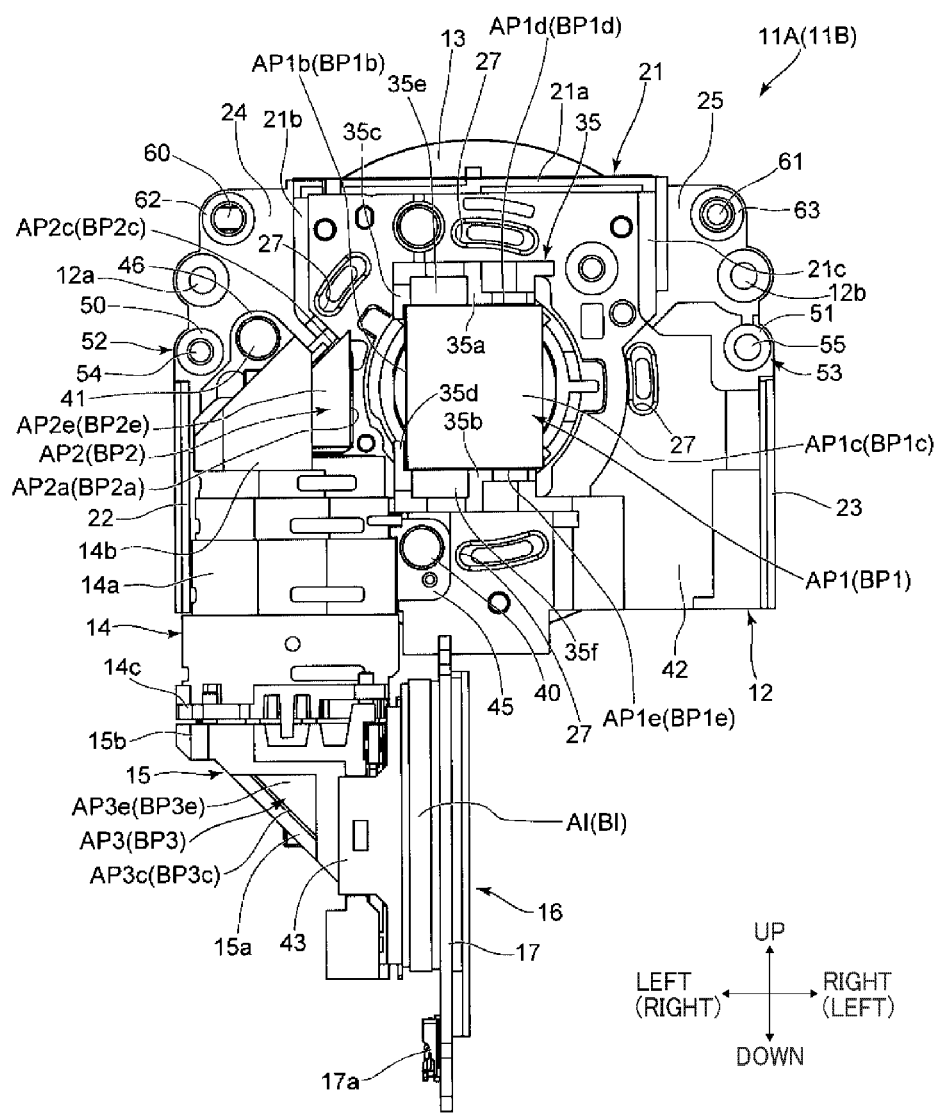
FIG. 11 is a rear view of one of the two separate lens barrels in FIG. 7.

By combining the above-described constituent elements, each of the lens barrel 11A and the lens barrel 11B is completely assembled. FIGS. 7 to 9 are illustrations of the lens barrel 11A and the lens barrel 11B, which are separated from each other. FIGS. 10 and 11 are illustrations of one of the lens barrel 11A and the lens barrel 11B. As can be seen from these drawings, the lens barrel 11A and the lens barrel 11B have the same structure.

Each of the lens barrel 11A and the lens barrel 11B has a size in the front-to-back direction accommodated within the width in the lateral direction (the front-to-back direction) of the substrate 17, except for a portion where each of the front groups AF and BF and a part of the front group frame 13 are exposed to the outside of the imaging apparatus 80. Each of the wide-angle lens system A and B is configured to be a folded optical system in which the optical path is bent multiple times using a plurality of prisms (the light is reflected (redirected) by a prism multiple times (a plurality of prisms are disposed to reflect the light multiple times))

within a plane (plane between the lenses closest to the object side in the wide-angle lens systems A and B) perpendicular to the optical axis X1, using a plurality of reflecting surfaces (AP1c, AP2c, AP3c, BP1c, BP2c, and BP3c). Further, the first prism AP1 and the first prism BP1 are brought close to each other as much as possible in the direction along the optical axis X1 (substantially the entire first prism AP1 and the first prism BP1 are accommodated in the same area in the front-to-back direction). This configuration enables the lens barrel 11A and the lens barrel 11B to be thin in the front-to-back direction.

Figure 6:
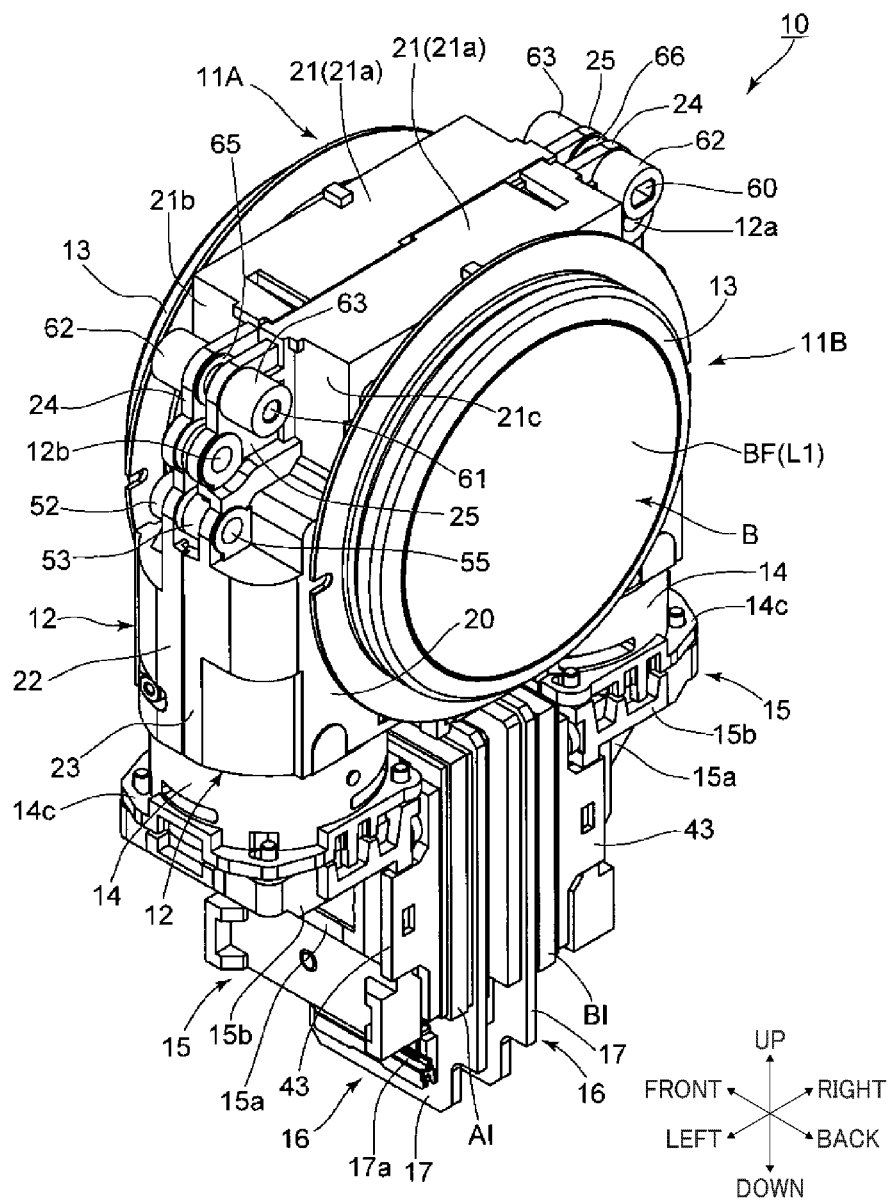
FIG. 6 is a perspective view of a combined lens barrel including the imaging system.

The lens barrel 11A and the lens barrel 11B having the same structure are combined to be together and opposed to each other along the front-to-back direction (see FIGS. 7 to 9), which provides the combined lens barrel 10 in a complete state as illustrated in FIG. 6. The lens barrel 11A and the lens barrel 11B have a structure in which the protrusions and recesses of the lens barrel 11A and the lens barrel 11B are combined by bringing the lens barrels 11A and 11B together. This configuration enable the lens barrel 11A and the lens barrel 11B to be coupled to each other compactly.

As illustrated in FIG. 10, a virtual plane Q1 and a virtual plane Q2 are indicated. The virtual plane Q1 includes the optical axis X1 and extends along the up-to-down direction. The virtual plane Q2 is perpendicular to the virtual plane Q1 and passes through the lower end of the base frame 12. In the lens barrel 11A, the optical path from the second prism AP2 to the image sensor AI after being bent by the first prism AP1 passes through the left area of the virtual plane Q1. In the lens barrel 11B, the optical path from the second prism BP2 to the image sensor BI after being bent by the first prism BP1 passes through the right area of the virtual plane Q1. On the left side of the virtual plane Q1, the constituent elements of the lens barrel 11A project beyond the base frame 12 to the back side of the imaging apparatus 80, whereas the constituent elements of the lens barrel 11B do not project beyond the base frame 12 to the front side of the imaging apparatus 80. Similarly, on the right side of the virtual plane Q1, the constituent elements of the lens barrel 11B project beyond the base frame 12 to the front side of the imaging apparatus 80, whereas the constituent elements of the lens barrel 11A do not project beyond the base frame 12 to the back side of the imaging apparatus 80. Thus, when the lens barrel 11A and the lens barrel 11B are combined, the rear group frames 14, the third prism frames 15, and the image sensor units 16 on the lens barrel 11A side and the lens barrel 11B side are arranged side by side symmetrically with respect to the virtual plane Q1 without interfering with each other.

As illustrated in FIG. 2, in the wide-angle lens systems A and B, light beams from the object, which have been reflected by the first prisms AP1 and BP1 to the left and right, respectively, are reflected by the third prisms AP3 and BP3 to travel in a direction to the virtual plane Q1 and reach the image sensors AI and BI, respectively. For this reason, the image sensor unit 16 on the lens barrel 11A side is close to the image sensor unit 16 on the lens barrel 11B side along right-to-left direction. Particularly, the substrate 17 on the lens barrel 11A side is close to the substrate 17 on the lens barrel 11B side across the virtual plane Q1. In the central portion of each of the lens barrels 11A and 11B along right-to-left direction, the first prism AP1/BP1 is disposed above the virtual plane Q2, and the two image sensor units 16 are arranged with the back surfaces opposed to each other below the virtual plane Q2. The substrates 17 on the lens barrel 11A side and the lens barrel 11B side has a planar shape substantially parallel to the virtual plane Q1. Further, there is a clearance between the substrates 17 on the lens barrel 11A side and the lens barrel 11B side in the right-to-left direction. Such a configuration prevents these substrates 17 from interfering with each other when the lens barrel 11A is brought close to the lens barrel 11B.

With the lens barrels 11A and 11B combined, the rear group frame 14 and the image sensor unit 16 are not aligned along the front-to-back direction (disposed at different positioned along right-to-left direction). With this arrangement, bringing the lens barrels 11A and 11B close to each other in the front-to-back direction does not cause a mutual interfere of the rear group frames 14 or the image sensor units 16. The first prisms AP1 and BP1 are aligned along the front-to-back direction when the lens barrels 11A and 11B are combined. That is, the positions of the first prisms AP1 and BP1 in the front-to-back direction have a significant effect on the distance between maximum angle-of-view points (FIG. 1) of each wide-angle lens system A/B and the thickness of the combined lens barrel 10 as a whole in the front-to-back direction.

As described above, in each of the lens barrels 11A and 11B, the first prism holder 35 of the base frame 12 holds a held part different from the reflecting surfaces AP1c and AP2c on the first prisms AP1 and BP2. Specifically, the side surfaces AP1d and AP1e of the first prism AP1 and the side surfaces BP1d and BP1e of the first prism BP1 are the held part. Further, when the adhesive spread to the side surfaces, the areas outside the effective diameter of the exit surfaces AP1b and BP1b of the first prisms AP1 and BP1 also serve as an auxiliary held part. Accordingly, there is no lens barrel structure that covers the reflecting surfaces AP1c and BP1c, and the reflecting surfaces AP1c and BP1c are exposed to the back side of the lens barrels 11A and 11B when the lens barrel 11A separates from the lens barrel 11B. When the positions of the lens barrels 11A and 11B in the front-to-back direction are determined by the contact surfaces 50 and 51 to be described later, the first prisms AP1 and BP1 are disposed close to each other such that the back surfaces of the reflecting surfaces AP1c and BP1c are opposed to each other. With this arrangement, the total thickness (the total length Z2 in FIG. 3) of the first prisms AP1 and BP1 in the front-to-back direction that actually occupies in the front-to-back direction is the same as the thickness (the length Z1 of each first prism in the front-to-back direction in FIG. 3) of each of the first prisms AP1 and BP1 although the first prisms AP1 and BP1 are arranged in the front-to-back direction.

Further, the image sensor unit 16 of the lens barrel 11A and the image sensor unit 16 of the lens barrel 11B are substantially at the same position in the front-to-back direction and are arranged side by side in the right-to-left direction. Accordingly, with a space in the front-to-back direction of the combined lens barrel 10 sufficient to accommodate the width of one substrate 17 in the lateral direction, the two image sensor units 16 are able to be accommodated below the first prisms AP1 and BP1 in the combined lens barrel 10.

With such a configuration, the thickness of the combined lens barrel 10 in the front-to-back direction can be reduced for the central portion of the combined lens barrel 10 in the right-to-left direction in which the constituent elements (the first prisms AP1 and BP1 and the image sensor units 16) of the lens barrels 11A and 11B overlap and for the vicinity of the ends of the combined lens barrel 10 in the right-to-left direction in each of which the constituent elements (the rear group frame 14 and the third prism frame 15) of one of the lens barrels 11A and 11B are disposed.

As described above, the constituent elements of the lens barrels 11A and the lens barrel 11B are disposed compactly in the combined lens barrel 10 in the front-to-back direction, the right-to-left direction, and the up-to-down direction. Thus, a compact structure is provided while including two lens barrels 11A and 11B. In particular, the first prisms AP1 and BP1, which are arranged in the front-to-back direction, are disposed with the reflecting surfaces AP1c and BP1c facing in the opposite directions and without any lens barrel structure having a significant thickness between the first prisms AP1 and BP1. Accordingly, the thickness of the combined lens barrel 10 in the front-to-back direction (the direction along the optical axis X1) can be reduced, and the distance between maximum angle-of-view points of the wide-angle lens systems A and B can be reduced.

The lens barrel 11A and the lens barrel 11B are disposed symmetrically along the front-to-back direction and brought together along the front-to-back direction so as to be combined with each other. Note that the lens barrel 11A and the lens barrel 11B are combined with a stable relative position such that the optical systems (the wide-angle lens systems A and B) of the lens barrels 11A and 11B face in the proper directions. Specifically, the lens barrel 11A and the lens barrel 11B are positioned in the front-front-to-back direction along the optical axis X1 and positioned in a direction along the plane perpendicular to the optical axis X1 (the up-to-down and right-to-left directions). Further, in order to make the imaging system 1 including the two optical systems (wide-angle lens systems A and B) work, after combining the lens barrel 11A and the lens barrel 11B (more specifically, after calibration of the imaging system 1 including the wide-angle lens systems A and B), a high bonding strength is needed to prevent a change in the relative positions between the lens barrels 11A and the lens barrel 11B due to, for example, external force.

A description is given of the structure that positions the lens barrel 11A and the lens barrel 11B in the front-to-back direction. On the base frame 12, a contact surface 50 is disposed on the back surface of the corner wall 24, and a contact surface 51 is disposed on the back surface of the corner wall 25. The contact surface 50 is formed as an end surface of a cylindrical boss 52 projecting forward and backward beyond the corner wall 24, and the contact surface 51 is formed as an end surface of a cylindrical boss 53 projecting forward and backward beyond the corner wall 25. Both the contact surface 50 and the contact surface 51 are annular planes perpendicular to the optical axis X1 and have a symmetrical shape in the front-to-back direction.

In the interior of the boss 52, a screw hole 54 whose long axis line is oriented in the front-to-back direction is formed. The screw hole 54 is open at the end on the back side at the contact surface 50, and the opposite front end is closed. Inside the boss 53, screw insertion holes 55 penetrating in the front-to-back direction are formed.

With the contact surfaces 50 opposed to the contact surface 51 of the lens barrel 11A and the lens barrel 11B, when the lens barrel 11A and the lens barrel 11B are brought together in the front-to-back direction with this relative position, the contacts surface 50 of the lens barrels 11A and 11B come into contact (abut) with and the contacts surface 51 of the lens barrels 11A and 11B, respectively, which determines the relative positions of the lens barrels 11A and 11B in the front-to-back direction. The contact surface 50 and the contact surface 51 in contact with each other are planes parallel to each other and are symmetrical to each other. By fixing the lens barrel 11A to the lens barrel 11B with the contact surfaces 50 in contact with the contact surfaces 51, the positional accuracy of the lens barrel 11A and lens barrel 11B of the combined lens barrel 10 in the front-to-back direction is controlled.

A screw is used to fix the lens barrel 11A to the lens barrel 11B. Specifically, a fixing screw is inserted into the screw insertion hole 55 of the lens barrel 11A from the front and screwed into the screw hole 54 of the lens barrel 11B. Further, a fixing screw is inserted into the screw hole 54 of the lens barrel 11B and screwed into the screw insertion hole 55 of the lens barrel 11B. By tightening the fixing screws, the lens barrel 11A and the lens barrel 11B are fixed to each other.

The base frame 12 of each of the lens barrels 11A and 11B directly holds (supports) a plurality of prisms (the first prism AP1, the first prism BP1, the second prism AP2, and the second prism BP2). Further, the front group frame 13 and the rear group frame 14 are attached to the base frame 12. That is, all the optical elements are supported by the base frame 12 as a support reference. Accordingly, in assembly of the combined lens barrel 10, as the assembly accuracy of the base frame 12 exerts a particularly great influence on the optical performance, the base frame 12 is provided with the contact surfaces 50 and 51 that serve as a relative position reference in the front-to-back direction of each of the lens barrels 11A and 11B.

The contact surface 50 and the contact surface 51 are disposed at the right and left ends of the base frame 12 along the right-to-left direction. The maximum distance between the contact surface 50 and the contact surface 51 in the right-to-left direction are provided under the dimensional restriction of the base frame 12. With an increase in the distance between the contact surface 50 and the contact surface 51 each serving as a position reference, the two base frames 12 are effectively prevented from being tilted, and thus the accuracy of positioning of the lens barrels 11A and 11B is increased. As illustrated in FIG. 12 or 14, the contact surface 50 and the rear group positioner 39 are disposed in a space on the back of the reflecting surfaces AP2c and BP2c of the second prisms AP2 and BP2. That is, the space is efficiently utilized. The contact surface 50 is disposed above the rear group frame holder 37 that holds the rear group frame 14. The contact surface 51 is disposed above the rear group frame accommodating section 42 that covers the rear group frame 14 from the back side. With such an arrangement, the contact surfaces 50 and 51 are disposed so as not to overlap with the positions of the rear groups AR and BR, the first prisms AP1 and BP1, and the second prisms AP2 and BP2, which are held by the respective base frames 12 on the back side. Further, the contact surface 50 and the contact surface 51 are disposed with a wide distance between the contact surface 50 and the contact surface 51.

The corner wall 24 includes the contact surface 50, and the corner wall 25 includes the contact surface 51. The corner wall 24 and the corner wall 25 are connected to the plurality of walls facing different directions in the vicinity of the upper wall 21 and the side walls 22 and 23. Accordingly, the corner wall 24 and the corner wall 25 have a planar shape and still high rigidity. That is, the contact surface 50 and the contact surface 51 have a high surface accuracy, which prevents the corner walls 24 and 25 from being distorted and allows for highly accurate positioning when the contact surface 50 comes into contact with contact surface 51.

Further, the boss 52 having the contact surface 50 and the boss 53 having the contact surface 51 are disposed substantially symmetrically relative to the optical axis X1 along the right-to-left direction. Such an arrangement provides a positioning accuracy equal in the front-to-back direction on the right and left sides of the optical axis X1, and is particularly advantageous in obtaining the positional accuracy of front groups AF and BF and the first prisms AP1 and BP1. Further, since the contact surfaces 50 and 51 provides high positioning accuracy and stability, the lens barrel 11A and the lens barrel 11B are combined without interfering with each other.

For example, when the lens barrel 11A is combined with the lens barrel 11B, the cylindrical portion 14a of the rear group frame 14 of a corresponding lens barrel 11A/11B comes into the rear group frame accommodating section 42 on the back side of each base frame 12, so that the cylindrical portion 14a (the rear group AR/BR) is positioned between the rear group frame holder 37 and the rear group frame accommodating section 42, which are opposed to each other. At this time, the rear group frame 14 (the rear group frame 14 on the lens barrel 11A side) that holds the rear group AR is covered from the back side (rear side) by the rear group frame accommodating section 42 provided on the base frame 12 of the lens barrel 11B. However, the rear group frame accommodating section 42 on the lens barrel 11B side is not in contact with the rear group frame 14 on the lens barrel 11A side because there is a clearance therebetween in the front-to-back direction. Accordingly, the rear group frame 14 of the lens barrel 11A side is maintained at a proper position within the rear group frame holder 37 on the base frame 12 of the lens barrel 11A. Similarly, the rear group frame 14 (the rear group frame 14 on the lens barrel 11B side) that holds the rear group BR is covered from the back side (front side) by the rear group frame accommodating section 42 provided on the base frame 12 of the lens barrel 11A. However, the rear group frame accommodating section 42 on the lens barrel 11A side is not in contact with the rear group frame 14 on the lens barrel 11B side because there is a clearance therebetween in the front-to-back direction. Accordingly, the rear group frame 14 of the lens barrel 11B side is maintained at a proper position within the rear group frame holder 37 on the base frame of the lens barrel 11B. In that manner, the base frames 12 are stably positioned with a high degree of accuracy using the contact surfaces 50 and 51, and thus each rear group frame 14 can be accommodated at a proper position of the rear group frame accommodating section 42 of each base frame 12 without any interference.

Each of the contact surface 50 and the contact surface 51 is a plane perpendicular to the optical axis X1, and has a symmetrical shape along the front-to-back direction. With such a configuration, when the lens barrel 11A is brought into contact with the lens barrel 11B along the optical axis X1 in the front-to-back direction so as to cause the contact surface 50 to contact the contact surface 51, no excess force is generated and a reliable and accurate positioning is made along the front-to-back direction.

The boss 52 having the contact surface 50 and the boss 53 having the contact surface 51 are both easily formed by a mold that separates in the front-to-back direction. Thus, the base frame 12 can be easily manufactured without an increase in cost.

When the lens barrel 11A is fixed to the lens barrel 11B with the contact surfaces 50 and 51 in contact with each other, the upper walls 21, the side walls 22, and the side walls 23 of the base frames 12 are combined to form the outer wall of the combined lens barrel 10 that continuous in the front-to-back direction. More specifically, on the upper surface of the combined lens barrel 10, the edge portions of the upper walls 21 (top portion 21a) of the lens barrel 11A and the lens barrel 11B are in contact with each other. On the left side surface of the combined lens barrel 10, the edge portion of the side wall 22 of the lens barrel 11A is in contact with the edge portion of the side wall 23 of the lens barrel 11B. On the right side surface of the combined lens barrel 10, the edge portion of the side wall 23 of the lens barrel 11A is in contact with the edge portion of the side wall 22 of the lens barrel 11B. These edge portions are opposed to each other with a slight clearance therebetween when the contact surfaces 50 and 51 contact each other, which exerts no influence on the positioning accuracy in the front-to-back direction by the contact surface 50 contacting the contact surface 51. A light shielding structure (a light shield) that prevents undesirable external light from entering the combined lens barrel 10 even with a clearance therebetween is provided at each edge portion of the upper wall 21, the side wall 22, and the side wall 23.

As described above, the relative positions of the lens barrel 11A and the lens barrel 11B in the front-to-back direction are determined by the contact surface 50 contacting the contact surface 51. Further, a predetermined clearance is provided along the front-to-back direction between the lens barrel 11A and the lens barrel 11B in an area except the areas of the contact surface 50 and the contact surface 51.

As illustrated in FIGS. 7, 9, 15, and 16, Each of the upper wall 35a and the lower wall 35b of the first prism holder 35 is formed such that the edge facing the back side has a stepwise shape formed by a continuous sets of a plane perpendicular to the optical axis X1 and a plane parallel to the optical axis X1. When the lens barrel 11A and the lens barrel 11B are combined, the stepped edge of the upper wall 35a of one of the lens barrel 11A and the lens barrel 11B is opposed to the stepped edge of the lower wall 35b of the other lens barrel 11A or 11B in the front-to-back direction with a slight clearance. When an excessive load (an excessive load in a direction in which the lens barrel 11A and the lens barrel 11B are brought together) is applied to the lens barrel 11A and the lens barrel 11B in the front-to-back direction, the edge of the upper wall 35a (the lower wall 35b) of the lens barrel 11A comes into contact with the edge of the upper wall 35a (the lower wall 35b) of the lens barrel 11B, which receives the load. That is, the opposing portions of the upper wall 35a and the lower wall 35b are used as an auxiliary contact to distribute the load between the lens barrel 11A and the lens barrel 11B, which strengthens the combined lens barrel 10 as a whole. Since the edges of the upper wall 35a and the lower wall 35b, i.e., the planes perpendicular to the optical axis X1 are opposed to each other, unnecessary component forces are not generated when the planes are brought into contact, so that the loads are reliably received by the planes. Particularly, the position at which the first prism holder 35 is provided is around the intermediate position between the contact surface 50 and the contact surface 51 which are significantly separated right-to-left direction, and a position at which the first prisms AP1 and BP1 are held having a significant influence on the optical performance. By receiving the load with the front and back load with the first prism holders 35 as an auxiliary tool, the strength of the combined lens barrel 10 as a whole is increased and the optical performance is obtained.

As described above, when the lens barrel 11A and the lens barrel 11B are combined, the cylindrical portion 14a of the rear group frame 14 fits in the space between the rear group frame holder 37 and the rear group frame accommodating section 42, which are opposed to each other in the front-to-back direction. On the back side of the base frame 12, a rear group frame opposing part 56 is formed in the rear group frame holder 37 (see FIGS. 14 to 16). The rear group frame opposing part 56 is a plane perpendicular to the optical axis X1.

With the rear group frame 14 attached to the base frame 12, the opposing convex portion 14d (FIG. 10) is positioned facing the rear group frame opposing part 56 of the base frame 12. In view of design, the opposing convex portion 14d is configured to contact the rear group frame opposing part 56. If there is a tolerance error that separates the opposing convex portion 14d from the rear group frame opposing part 56, a flexible member is inserted between the base frame 12 and the rear group frame 14 to give a biasing force to the rear group frame 14 so as to come into contact with the rear group frame opposing part, which provides a stable contact action. Specifically, when the opposing convex portion 14d of the rear group frame 14 is separated from the rear group frame opposing part 56 on the lens barrel 11A side, a flexible member is disposed on the inner surface of the rear group frame accommodating section 42 of the base frame 12 on the lens barrel 11B side. Accordingly, the rear group frame 14 on the lens barrel 11A is pressed forward to make the opposing convex portion 14d contact the rear group frame opposing part 56. In such a manner, the position of the rear group frame 14 is controlled with high accuracy in each of the lens barrels 11A and 11B. Note that contacting of the opposing convex portion 14d and the rear group frame opposing part 56 does not hamper the positioning of the rear group frame 14 using the support tabs 45 and 46, the rear group positioners 38 and 39 of the lens barrels 11A and 11B, and also does not hamper the positioning of the lens barrels 11A and 11B using the contact surfaces 50 and 51. Positioning by the rear group positioners 38 and 39 or the contact surfaces 50 and 51 is prioritized.

The relative positions of the first prisms AP1 and BP1 in the front-to-back direction is determined by the holding positions at which the first prism holder 35 of the base frame 12 holds the first prisms AP1 and BP1 in the lens barrels 11A and 11B, and the contact relation between the contact surfaces 50 and 51 of the lens barrels 11A and 11B. When the contact surfaces 50 and 51 of the lens barrels 11A and 11B are in contact with each other, the first prisms AP1 and BP1 are positioned relative to each other such that there is a small clearance CL (see FIG. 3 and FIG. 4) between the reflecting surface AP1c of the first prism AP1 and the reflecting surface BP1c of the first prism BP1 is provided. Thus, although the first prisms AP1 and BP1 are disposed close to each other in the front-to-back direction, the lens barrels 11A and 11B are positioned relative to each other in the front-to-back direction, with reference to the contact surfaces 50 and 51.

Unlike the configuration of the present embodiment, in the configuration in which the reflecting surfaces AP1c and BP1c are in contact with each other, the light from the subject passes through the reflecting surfaces AP1c and BP1c without a reflection thereon due to the same medium (such as glass constituting the prism) being located on both sides of the boundary between the reflecting surfaces AP1c and BP1c. In order to cause the reflection of the light from the subject, a reflective film is applied to the reflecting surfaces AP1c and BP1c. By contrast, in the configuration of the embodiment in which the reflecting surfaces AP1c and BP1c are not in contact with each other (separated from each other), the reflecting surfaces AP1c and BP1c serve as the reflective optical element without any reflective film on the reflecting surfaces AP1c and BP1c. In view of this, by slightly separating the reflecting films AP1c and BP1c from each other while making the first prisms AP1 and BP1 close to each other as much as possible in the front-to-back direction to reduce the thickness of the combined lens barrel 10 and increase the quality of combined images, the production cost of the first prisms AP1 and BP1 can be reduced without the reflective film.

Similar to the rear group positioners 38 and 39 described above, the contact surfaces 50 and 51 are located within planes that intersect with the reflecting surfaces AP1c and BP1c of the first prisms AP1 and BP1 at an angle of 45°. More specifically, as illustrated in FIG. 8, the contact surface 50 and 51 are located on a virtual plane S1 (a plane on which the annular plane 39a of the rear group positioner 39 is located) that intersects with the reflecting surfaces AP1c and BP1c at an angle of 45°. With this configuration, when the contact surfaces 50 and 51 are brought into contact with each other and the lens barrels 11A and 11B are combined, the relative positions of the reflecting surfaces AP1c and BP1c of the first prisms AP1 and BP1 are adjusted with high precision. Accordingly, the clearance CL between the reflecting surfaces AP1c and BP1c is precisely defined.

A description is given of a configuration that determines the positions of the lens barrel 11A and the lens barrel 11B in a direction perpendicular to the optical axis X1. The base frame 12 of each of the lens barrel 11A and lens barrel 11B has a first hole 60 and a second hole 61. A first hole 60 is formed inside a cylindrical boss 62 projecting forward and backward beyond the corner wall 24, and a second hole 61 is formed inside a cylindrical boss 63 projecting forward and backward beyond the corner wall 25. The boss 62 is positioned above the boss 52 having the contact surface 50, and the boss 63 is positioned above the boss 53 having the contact surface 51. Both the first hole 60 and the second hole 61 are through-holes penetrating the base frame 12 in the front-to-back direction. The first hole 60 and the second hole 61 are provided at substantially symmetrical positions (substantially equidistant from the virtual plane Q1 in the right-right-to-left direction) with respect to the virtual plane Q1 (FIG. 10) including the optical axis X1 and extending in the up-to-down direction.

The first hole 60, which penetrates the cylindrical boss 62 in the front-rear direction, has a large-diameter hole portion having a substantially circular inner peripheral surface and an elongated hole portion whose width in the up-to-down direction is narrower than that of the large-diameter hole portion. The elongated hole portion has a second hole 61 whose longitudinal direction is along right-to-left direction (the radial direction of the circular hole portion 60a). The second hole 61, which penetrates the boss 63 in the front-to-back direction, has a substantially circular inner peripheral surface.

The shaft member 65 and the shaft member 66 FIG. 7 are inserted into the first hole 60 and the second hole 61 of the base frame 12, respectively in each of the lens barrels 11A and 11B. The shaft member 65 has a front shaft portion that is inserted into the large-diameter hole portion of the first hole 60 of the lens barrel 11A and a rear shaft portion that is inserted into the second hole 61 of the lens barrel 11B on the same axis. The shaft member 66 has a front shaft portion that is inserted into the large-diameter hole portion of the first hole 60 of the lens barrel 11A and a rear shaft portion that is inserted into the second hole 61 of the lens barrel 11B on the same axis. The rear shaft portion of the shaft member 66 has a smaller diameter than the front shaft portion does.

In the drawings of the present embodiments, the cases in which the position of the lens barrel 11B is adjusted with reference to the lens barrel 11A are illustrated. First, the front shaft portion of the shaft member 65 is inserted from the back side into the large-diameter hole portion of the first hole 60 on the lens barrel 11A side, and the front shaft portion of the shaft member 66 is inserted into the second hole 61 from the back side on the lens barrel 11A side. Subsequently, the lens barrel 11B is attached to the lens barrel 11A in which the shaft member 65 and the shaft member 66 are assembled. When the lens barrel 11A and the lens barrel 11B are brought close to each other in the front-to-back direction, the rear shaft portion of the shaft 65 is inserted into the second hole 61 of the lens barrel 11B, and the rear shaft portion of the shaft member 66 is inserted into the elongated hole of the first hole 60 of the lens barrel 11B.

When the second hole 61 on the lens barrel 11B side fits to the rear shaft portion of the shaft member 65, the movement of the base frame 12 on the lens barrel 11B side in the radial direction of the shaft 65 (all the direction perpendicular to the optical axis X1) is restricted. With such a configuration, the relative positions of the lens barrel and the lens barrel 11B are determined within a plane perpendicular to the optical axis X1. In addition, with the rear shaft portion of the shaft member 66 fit into the inside (surrounded by the inner surface) of the elongated hole portion of the first hole 60 on the lens barrel 11B side, the movement of the base frame 12 on the lens barrel 11B side is restricted relative to the shaft member 66. As a result, the rotation of the lens barrel 11A relative to the lens barrel 11B around the shaft member 65 is restricted. Further, since the length of the elongated hole 60 in the right-to-left direction is larger than the outer diameter of the rear-side shaft portion of the shaft member 66, the shaft member 66 does not restrict the position of the lens barrel 11B in the right-to-left direction. That is, the elongated hole of the first hole 60 of the lens barrel 11B is movable relative to the shaft member 66 only in a certain direction (the right-to-left direction) within a plane perpendicular to the direction in which the first hole 60 and the second hole 61 are opposed to each other (the direction along the optical axis X1). With such a configuration, the small diameter shaft and the first hole 60 work to cancel out assembly tolerances between the lens barrel 11A and the lens barrel 11B.

The positions at which the shaft member 65 and the shaft member 66 are positioned are close to the positions at which positioning is made by the contact surface 50 and the contact surface 51 along the front-to-back direction. The shaft member 65 and the shaft member 66 are disposed substantially symmetrically with respect to the virtual plane Q1 (FIG. 10) that includes the optical axis X1 and extends along the up-to-down direction. With such a configuration in which the distance between the shaft member 65 and the shaft member 66 along the right-to-left direction is increased, and in which the shaft member 65 and the shaft member 66 are disposed symmetrically in positions relative to the front group AF and BF and the first prisms AP1 and BP1, the accuracy of positioning is increased.

The first hole 60 and the second hole 61 into which the shaft member 65 and the shaft member 66 are inserted are arranged in the corner wall 24 and the corner wall 25, respectively of the base frame 12, which enables space to be efficiently utilized without interfering with the other components constituting the lens barrel 11A and lens barrel 11B. In addition to the rigidity of the square wall portions 24 and 25 themselves, they are reinforced by the thickness of the boss 62 having the first hole 60 and the boss 63 having the second hole 61. Is less likely to be distorted when positioning with the shaft member 65 and the shaft member 66.

In the present embodiment as described above, the lens barrel 11A including the wide-angle lens system A and the image sensor AI is combined with the lens barrel 11B including the wide-angle lens system B and the image sensor BI so as to constitute the combined lens barrel 10. Each imaging system is housed in a corresponding lens barrel 11A/11B, which facilitates assembling the optical components in each of the lens barrels 11A and 11B, and thus increases the productivity. Further, two lens barrels whose imaging performances are similar and selected as the lens barrel 11A and the lens barrel 11B to be combined. Accordingly, it is easy to control the performance of the imaging system 1 as a whole. In a mode that assembles a plurality of optical systems in one lens barrel, when any failure is found in one optical system after completion of the lens barrel (in particular, after the parts are fixed by, for example, adhesion), the entire system including the other optical systems with no failure is discarded, resulting in waste. However, the configuration according to the embodiments of the present disclosure that combines the lens barrel 11A and the lens barrel 11B is advantageous to an increase in productivity and a reduction in cost without any waste.

In addition, the lens barrels 11A and 11B are combined such that the first prisms AP1 and BP1 constituting first reflecting surfaces (AP1c and BP1c) of the folded optical system of the lens barrels 11A and 11B are held by the held parts (the side surfaces AP1d and AP1e, and the side surfaces BP1d and BP1e) at different positions from the reflecting surfaces AP1c and BP1c. In this state, the reflecting surfaces AP1c and BP1c are opposed to each other. With this configuration, the first prisms AP1 and BP1 can be arranged close to each other without obstruction of other components of the lens barrel. Thus, the thickness of the combined lens barrel 10 is reduced, and the quality of combined images increases due to the incident position of the wide-angle lens system A close to the incident position of the wide-angle lens system B.

In addition, the first prisms AP1 and BP1 are brought close to each other while the reflecting surfaces AP1c and BP1c face each other without being brought into contact with each other. With this configuration, a successful reflective performance is obtained independent of, for example, a reflective film.

In addition, the two lens barrels 11A and 11B including the first prisms AP1 and BP1 have the same specification as a whole. Accordingly, a reduction in the cost for parts and an increase in productivity are achieved. Further, the first prisms AP1 and BP1, which have the same specifications, are disposed symmetrically along the front-to-back direction such that the reflecting surfaces AP1c and BP1c are opposed to each other. Accordingly, the first prisms AP1 and BP1 can be accommodated within the combined lens barrel 10 compactly.

Still further, the rear group positioners 38 and 39 and the contact surfaces 50 and 51 are provided within planes (the virtual planes S1 and S2) that intersect with the reflecting surfaces AP1c and BP1c of the first prisms AP1 and BP1 at an angle of 45°. The rear group positioners 38 and 39 are used to position the rear group frame 14 with respect to the respective base frames 12, and the contact surfaces 50 and 51 determine the relative positions of the two base frames 12 in the front-to-back direction. Accordingly, the relative positions of the optical components (particularly, the first prism AP1 relative to the rear group AR, and the first prism BP1 relative to the rear group BR) assembled with reference to the base frame 12 can be adjusted with high precision. In addition, the optical precision of the lens barrels 11A and 11B when two base frames 12 are combined can be increased.

In the prisms such as the first prisms AP1 and BP1, the side surfaces located on the both sides of each of the incident surface, the exit surface, and the reflecting surface along the right-to-left direction are applicable as the held part. Since the side surfaces of the prism have nothing to do with proceeding of light from the subject (transmission or reflection), holding of the side surfaces less affect the optical performance. For example, the side surface can be formed as an opaque ground surface, and bonding with adhesion can be easily performed on the ground surface. Further, since the side surfaces are on both sides of the prism, holding of the prism from both sides immobilizes the prism with high precision.

The first prism holder 35 of the base frame 12 has a shape such that the upper wall 35a cover substantially all of the side surfaces AP1d and BP1d and the lower wall 35b covers substantially all of the side surfaces AP1e and BP1e. By holding the first prisms AP1 and BP1 by both (upper and lower) sides, that is, the upper wall 35a and the lower wall 35b, excellent holding precision and high holding strength are provided.

Further, the first prism holder 35 holds the first prisms AP1 and BP1 in an auxiliary manner with an adhesive that has flown into between the vertical walls 35c and 35d and the exit surfaces AP1b and BP1b. In this case, the first prisms AP1 and BP1 are more firmly held in the right-to-left direction of the lens barrels 11A and 11B (the direction of travel of the light reflected by the reflecting surfaces AP1c and BP1c along the optical axis X2).

In the combined lens barrel 10 of the embodiment, the first prisms AP1 and BP1, whose relative positions are set as described above, reflect the light from the subject to the opposite directions. Subsequently, the second prisms AP2 and BP2 and the third prisms AP3 and BP3 change the direction of travel of the light from the subject. Accordingly, the two wide-angle lens systems A and B can be configured to be thin in the front-to-back direction in areas other than the area on the optical X1 at which the first prisms AP1 and BP1 are located.

Figure 17A:
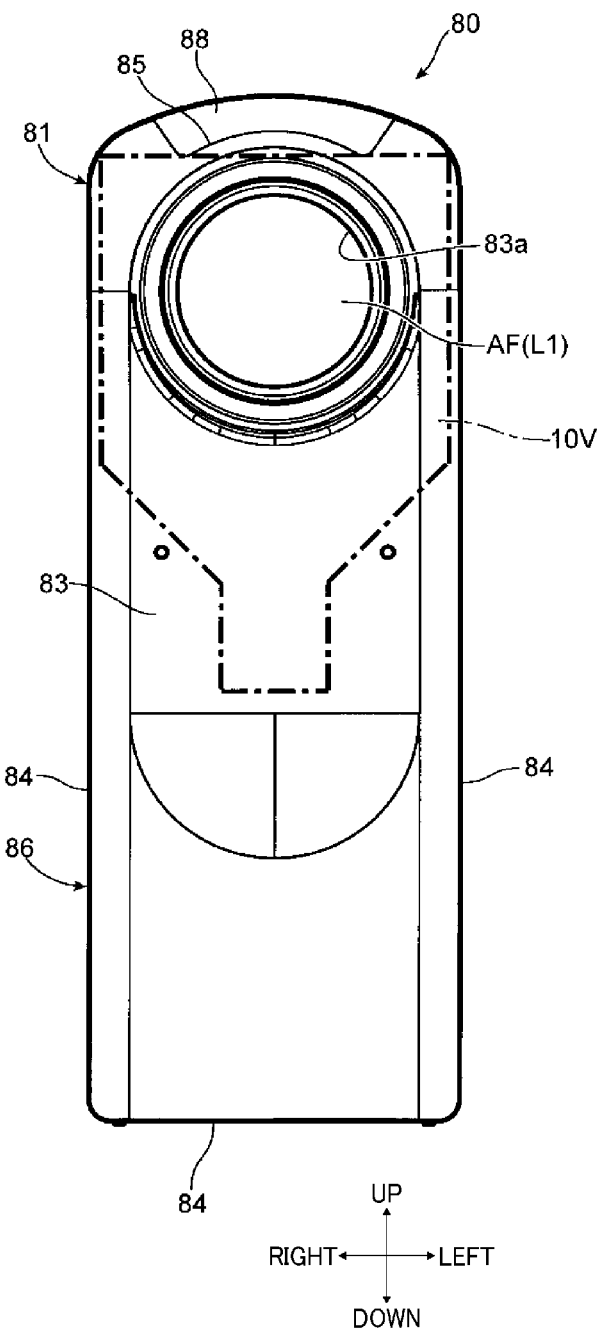
FIG. 17A is a front view of the external appearance of an imaging apparatus equipped with the combined lens barrel.
Figure 17B:
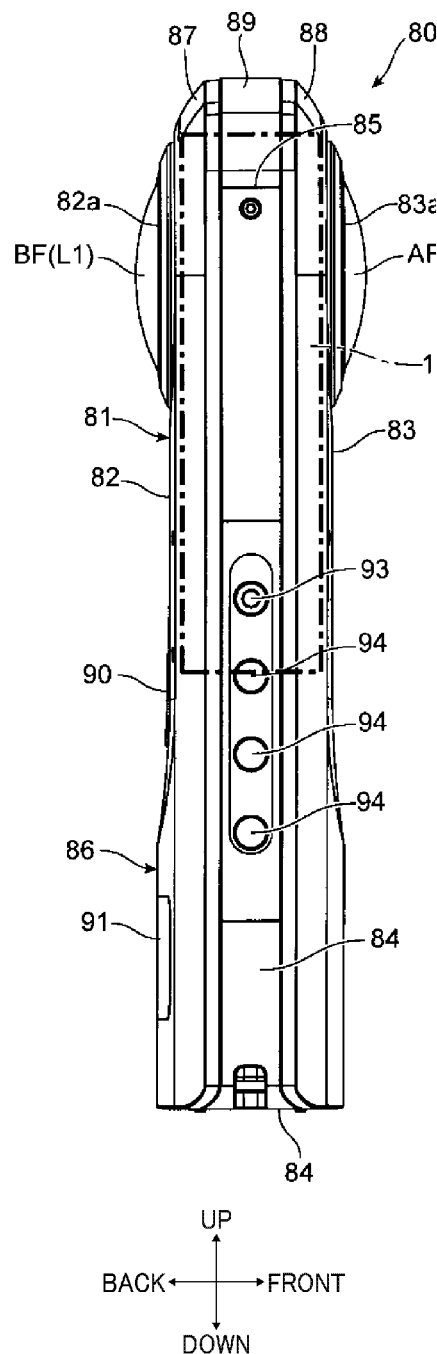
FIG. 17B is a right-side view of the imaging apparatus.

FIGS. 17A and 17B are illustrations of an imaging apparatus 80 for capturing a spherical image on which the imaging system 1 and the combined lens barrel 10 according to the embodiment are mounted. FIG. 17A is a front view of the imaging device 80 as viewed from the front, and FIG. 17B is a side view of the imaging device 80 as viewed from the right. In FIGS. 17A and 17B, the occupied area 10V is indicated that the combined lens barrel 10 occupies within the casing 81. Note that the occupied area 10V in FIG. 17B excludes a part of the front groups AF and BF protruding forward and backward of the casing 81.

The imaging apparatus 80 includes a casing 81 in which the components of the imaging apparatus 80 are assembled. The casing 81 is short in the right-to-left direction and long in the up-to-down direction. The casing 81 has a predetermined thickness in the front-to-back direction and has a round top. The casing 81 has a rear metal casing 82 that covers the back side (the lens barrel 11B side) of the combined lens barrel 10 and a front metal casing 83 that covers the front side (the lens barrel 11A side) of the combined lens barrel 10. The rear metal casing 82 and the front metal casing 83 are connected by a peripheral casing 84 that surrounds the left and right side surfaces and the lower surface of the imaging apparatus 80. The combined unit of the rear metal casing 82, the front metal casing 83, and the peripheral casing 84 has an opening 85 that opens upward. The opening 85 is closed by a rear resin casing 87, a front resin casing 88, and a connecting resin casing 89.

The rear metal casing 82 has a substantially circular lens exposure hole 82a at the upper portion, and the front metal casing 83 has a substantially circular lens exposure hole 83a at the upper portion. The front group AF (first lens L1) of the wide-angle lens system A is exposed through the lens exposure hole 83a, and the front group BF (first lens L1) of the wide-angle lens system B is exposed through the lens exposure hole 82a. A shutter button 90 serving as a trigger for imaging (still image imaging, moving image imaging) is provided slightly below the middle portion of the rear metal casing 82 in the vertical direction. The imaging apparatus 80 further includes a display unit 91 below the shutter button 90, configured to display several pieces of information for, for example, an operation screen and a setting screen. A power button 93 is disposed on the right-side portion of the peripheral casing 84, used to switch on and off the imaging system 1. A plurality of operation buttons 94 are disposed below the power button 93, used to operate the setting of the shooting mode or the wireless connection mode. The power button 93 and the operation button 94 constitute operation means for operating the combined lens barrel 10 to perform imaging.

The combined unit of the rear metal casing 82, the front metal casing 83, and the peripheral casing 84 constitute a grip portion 86 below the intermediate portion of the casing 81 along the up-to-down direction. The photographer is able to press the shutter button 90, the power button 93, and the plurality of operation buttons 94 while holding the grip portion 86. The combined lens barrel 10 is accommodated in an internal space above the grip portion 86 in the casing 81. Within the internal space below the combined lens barrel in the casing 81, a battery and a circuit board are accommodated.

As can be seen from FIG. 17B, the combined lens barrel 10 in which the reflecting surfaces AP1c and BP1c of the first prisms AP1 and BP1 are disposed close to each other is reduced in size, particularly in the front-to-back direction (the direction of the incident optical axis).

Although the embodiment of the present disclosure has been described above, the present disclosure is not limited to such a specific embodiment, and various modifications and changes can be made without departing from the spirit and scope of the disclosure. For example, in the above-described embodiment, prisms (particularly, the first prisms AP1 and BP1) are used as the reflective optical elements in the wide-angle lens systems A and B (the folded optical systems). Any different types of reflective optical element, such as mirrors, are applicable as long as they have a reflecting surface. In the case of mirrors as well, a held part may be provided on a portion other than the reflecting surface so as to exhibit the same advantageous effect as described above.

In the above-described embodiment, each of the wide-angle lens systems A and B includes a plurality (three) of reflecting surfaces (reflective optical elements). Alternatively, each optical system may include one reflecting surface (reflective optical element). Still alternatively, each optical system may include two reflecting surfaces (reflective optical elements). Even alternatively, each optical system may include four reflecting surfaces (reflective optical elements).

In the above-described embodiment, in assembling the first prisms AP1 and BP1, the rear group positioners 38 and 39 are used as a reference to position the rear groups AR and BR (the rear group frame 14) in the base frame 12 with respect to the assembly jig. Further, the second prism holder 36 may be used as a reference to determine the positions of the second prisms AR2 and BR2 with respect to the assembly jig.

In the above-described embodiments, each of the base frames 12 includes the contact surfaces 50 and 51 at positions away from each other along the right-to-left direction (near the left and right ends of each base frame 12). The contact surfaces 50 and 51 are brought into contact with each other so as to determine the relative positions of the lens barrels 11A and 11B. Alternatively, in assembling the lens barrels 11A and 11B, other portions other than the contact surfaces 50 and 51 may be brought into contact. As an example, the first prism holder 35 on the lens barrel 11A side and the first prism holder 35 on the lens barrel 11B side may be brought into contact with each other. The combined lens barrel 10 of the above-described embodiment is configured such that the wide-angle lens systems A and B occupy a certain width in the right-to-left direction on the left and right sides of the first prisms AP1 and BP1. Thus, it is appropriate from the viewpoint of the positioning precision to determine the relative positions of the lens barrels 11A and 11B by bringing the contact surfaces 50 and 51, which are located near the edges of the combined lens barrel 10 in the right-to-left direction, into contact with each other. However, in a type of lens barrel with a narrow width in the right-to-left direction, the relative positions of the lens barrels 11A and 11B are obtained with desired precision by the parts (parts corresponding to the first prism holder 35) located near the center of the combined lens barrel 11 in the right-to-left direction. In the configuration in which the first prism holder 35 located near the first prisms AP1 and BP1 is a part to be brought into contact between the two lens barrels, the clearance CL between the reflecting surfaces AP1c and BP1c of the first prisms AP1 and BP1 can be precisely adjusted.

In the above-described embodiments, the contact surfaces 50 and 51 on each base frame are both planes (parallel planes in contact with each other) perpendicular to the front-to-back direction. With this configuration, when the contact surfaces 50 and 51 come into contact with each other, a component force in a direction intersecting with the contact direction (front-to-back direction) does not occur, and the positions of the two base frames 12 in the front-to-back direction is stably determined. However, a configuration in which the contacts disposed on each base frame 12 are not planes (the contact surfaces 50 and 51) perpendicular to a direction in which the contacts face each other may be applicable. Further, the number of contacts provided on each base frame 12 may be one, or three or more.

In the above-described embodiment, the contact surface 50 and the contact surface 51 provided on the two base frames 12 have a symmetrical shape such that the contact surface 50 and the contact surface 51 face and contact each other, but may have an asymmetric structure. For example, one contact has a plane, and the other contact includes a plurality of protrusions to contact the plane.

That is, according to the embodiments of the present disclosure, the positioner for positioning two reflective optical elements (the first prisms AP1 and BP1) may be other parts other than the above-described contact surfaces 50 and 51 as long as the positioner is able to properly adjust the relative distance between the two reflective optical elements when the two holding bodies (base frames 12) each holding an imaging optical system are combined.

The embodiments of the present disclosure are particularly effective in an optical system in which two imaging units to be combined have the identical shape. In the above-described embodiment, the two lens barrels 11A and 11B constituting the optical system have completely the identical shape. However, even when two lens barrels having different optical systems and other parts are combined, a predetermined effect can be obtained by applying the embodiments of the present disclosure. For example, the embodiment of the present disclosure is also applicable in a configuration in which two reflective optical elements (the first prisms AP1 and BP1 according to the above-described embodiment) arranged in the front-to-back direction (the direction extending along the optical axis X1) have the reflecting surfaces having different sizes. In such configuration, the width of the optical system can be reduced and the image quality can be increased when a held part at a position different from each reflecting surface is held by a corresponding one of the reflective optical elements while the reflecting surfaces are at least partially opposed to each other. Note that in the embodiments of the present disclosure, regarding the identicalness (identical shape and the same specification) of the elements constituting the lens barrels 11A and 11B, a slight difference is acceptable as a result of manufacturing with the aim of identity, such as tolerance within a design range. For example, even if the first prism AP1 and the first prism BP1 manufactured and designed to have the identical shape include a dimensional error within an allowable range as a product, the first prisms AP1 and BP1 have the identical shape, which satisfies the requirement that the shape is identical with each other.

In the above-described embodiment, in the single state of the lens barrels 11A and 11B, there is no structure of the lens barrel on the back side of the reflecting surfaces AP1c and BP1c of the first prisms AP1 and BP1, and the reflecting surfaces AP1c and BP1c are exposed as a whole. From the viewpoint of eliminating restrictions on the interval setting of the reflecting surfaces AP1c and BP1c when the two lens barrels 11A and 11B are combined, the configuration in which the structure of the lens barrel covering the reflecting surfaces AP1c and BP1c does not exist is most suitable. However, no limitation is intended therein, and any member may be present on the back side of the reflecting surfaces AP1c and BP1c.

For example, means for improving the reflection efficiency (such as reflection film or the like) or means for improving the light shielding property (mask for light shielding or the like) may be arranged on or behind the reflecting surfaces AP1c and BP1c. Unlike the structure for holding the first prisms AP1 and BP1, there is no need for these means to have a large thickness for obtaining the holding strength, so that these means less affect setting of the relative positions between the reflecting surfaces AP1c and BP1c and substantially the same effect as the embodiments can be obtained. That is, the configuration according to the embodiments in which the reflecting surfaces of the two reflective optical elements are opposed to each other means that two reflecting surfaces are facing each other without any structure for holding the reflective optical elements between the reflecting surfaces. In some other embodiments, any element other than the structure for holding may be disposed between the two reflecting surfaces.

In the above-described embodiment, the clearance CL is provided between the reflecting surfaces AP1c and BP1c of the first prisms AP1 and BP1. Alternatively, the reflecting surfaces of two reflective optical elements may be in contact with each other. In the embodiments of the present disclosure, the configuration in which two reflecting surfaces are opposed to each other includes a configuration in which the reflecting surfaces are in contact with each other. Contacting of the reflecting surfaces does not correspond to holding by the holding body (corresponding to the base frame 12 in the above-described embodiment). That is, such a configuration can exhibit the same effects as those of the embodiments because the reflecting surface of the reflective optical element of each optical system is not held by the holding body (the reflecting surface is not a held part) before the optical system is assembled by incorporating two imaging optical systems. Further, the configuration in which the reflecting surfaces of the two reflective optical elements are in contact with each other is advantageous in a reduction in the size of the optical system because two reflective optical elements are close to each other as much as possible.

In the combined lens barrel 10 according to an embodiment of the present disclosure, the optical axis X1 of the lens barrel 11A and the optical axis X1 of the lens barrel 11B are arranged coaxially. The configuration according to the embodiment of the present disclosure is also applicable to an optical system in which the optical axes of incident light from a subject in the imaging optical systems are not coaxially arranged. That is, the directions of travel of the light from the subject in the imaging optical systems are not limited to the directions symmetrical about the front-to-back direction as in the above-described embodiments as long as two imaging optical systems are disposed such that the light from the subject is incident on the imaging optical systems from different directions. In addition, the arrangement of the reflective optical elements is satisfactory as long as the reflecting surfaces (AP1$c$ and BP1$c$) of two reflective optical elements (the first prisms AP1 and BP1) disposed on the axes of incident light of the two imaging optical systems are at least partially opposed to each other.

In the above-described embodiments, cases in which two lens barrels 11A and 11B including the wide-angle lens systems A and B and the image sensors AI and BI (two imaging units) are combined are described. The optical system according to the embodiments of the present disclosure may be applied to a configuration that the holding bodies are combined without the image sensors AI and BI in the lens barrels 11A and 11B (that is, the image sensors AI and BI are separate from the optical system).

In the above-described embodiments, the rear group frames 14 that hold the respective lenses of the rear groups AR and BR are attached to the base frames 12 each constituting the holding body. Alternatively, a configuration in which each lens constituting the rear group AR/BR is directly held by the base frame 12 (a configuration that includes a lens positioner in which the base frame 12 directly holds each lens of the rear group AR/BR) is applicable. That is, the holding body according to the embodiments of the present disclosure is configured to directly or indirectly hold the optical elements, such as a lens, other than the reflective optical elements and positions the optical elements. The specific configuration of the holder is not limited to the base frame 12 according to the above-described embodiments.

In the above-described embodiment, the combined lens barrel 10 includes two wide-angle lens systems A and B. Alternatively, three or more imaging optical systems may be included in the optical system. In such a case, the embodiment is applied to at least two of the three or more imaging optical systems so as to obtain desired effects.

In the above-described embodiments, the combined lens barrel 10 or the imaging apparatus 80 generate a spherical image. However, no limitation is intended thereby, and an image obtained by the optical systems may be an image other than a spherical image, such as a panoramic image obtained by photographing 360 degrees only in a horizontal plane.

Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

This patent application is based on and claims priority pursuant to Japanese Patent Application No. 2019-020399, filed on Feb. 7, 2019 in the Japan Patent Office, the entire disclosure of which is hereby incorporated by reference herein.

EXPLANATION OF REFERENCE SIGNS

1: Imaging system
10: Combined lens barrel
11A: Lens barrel
11B: Lens barrel
12: Base frame (holding body)
13: Front group frame
14: Rear group frame
15: Third prism frame
16: Image sensor unit
17: Substrate
26: Front group frame contact
35: First prism holder (holder)
35$a$: Upper wall
35$b$: Lower wall
35$c$: Vertical wall
35$d$: Vertical wall
36: Second prism holder
37: Rear group frame holder
38: Rear group positioner (lens positioner)
39: Rear group positioner (lens positioner)
42: Rear group frame accommodating section
45: Support tab
46: Support tab
50: Contact surface (contact)
51: Contact surface (contact)
65: Shaft member
66: Shaft member
80: Imaging apparatus
81: Casing
93: Power button (operation means)
94: Operation button (operation means)
A: Wide-angle lens system
AF: Front group
AI: Image sensor (one image sensor)
AP1: First prism (reflective optical element)
AP1$a$: Incident surface
AP1$b$: Exit surface
AP1$c$: reflective surface
AP1$d$: Side surface (held part)
AP1$e$: Side surface (held part)
AP2: Second prism
AP2$c$: Reflecting surface
AP3: Third prism
AP3$c$: Reflecting surface
AR: Rear group
AR2: Second prism
B: Wide-angle lens system
BF: Front group BI: Image sensor (the other image sensor)
BP1: First prism (reflective optical element)
BP1a: Incident surface
BP1b: Exit surface
BP1c: Reflecting surface
BP1d: Side surface (held part)
BP1e: Side surface (held part)
BP2: Second prism
BP2c: Reflecting surface
BP3: Third prism
BP3c: Reflecting surface
BR: Rear group
CL: Clearance between the reflecting surfaces of the first prism
X1: Optical axis (optical axis of incident light)
X2: Optical axis
X3: Optical axis
X4: Optical axis

The invention claimed is:

1. An optical system, comprising:
a first imaging optical system including a first reflective optical element, wherein the first reflective optical element includes a first reflecting surface and a first side surface at a different position from the first reflecting surface, and the first reflecting surface is configured to reflect light incident from a subject side;
a second imaging optical system including a second reflective optical element, wherein the second reflective optical element includes a second reflecting surface and a second side surface at a different position from the second reflecting surface, and the second reflecting surface is configured to reflect light incident from the subject side;
a first frame including a first wall to fix the first side surface of the first reflective optical element; and
a second frame including a second wall to fix the second side surface of the second reflective optical element, wherein
when the first frame is aligned with the second frame, the first reflecting surface of the first reflective optical element is opposed to the second reflecting surface of the second reflective optical element,
the first frame does not contact the first reflecting surface and does not contact a first back surface opposite the first reflecting surface of the first reflective optical element, and
the second frame does not contact the second reflecting surface and does not contact a second back surface opposite the second reflecting surface of the second reflective optical element.

2. The optical system according to claim 1, wherein when the first frame is aligned with the second frame, the first reflecting surface of the first reflective optical element is not in contact with the second reflecting surface of the second reflective optical element.

3. The optical system according to claim 1, wherein the first reflective optical element and the second reflective optical element have a same shape.

4. The optical system according to claim 1, wherein
the first frame includes a first lens positioner within a first plane intersecting with the first reflecting surface of the first reflective optical element,
the first plane extends along a direction at which light is reflected by the first reflecting surface of the first reflective optical element, and
the first lens positioner is configured to position a lens constituting the first imaging optical system with respect to the first frame.

5. The optical system according to claim 4, wherein the first lens positioner is configured to position the lens with respect to the first frame in a direction along an optical axis of light incident on the first reflective optical element and in a direction perpendicular to the optical axis of the light incident on the first reflective optical element.

6. The optical system according to claim 4, wherein
the second frame includes a second lens positioner within a second plane intersecting with the second reflecting surface of the second reflective optical element,
the second plane extends along a direction at which light is reflected by the second reflecting surface of the second reflective optical element, and
the second lens positioner is configured to position a lens constituting the second imaging optical system with respect to the second frame.

7. The optical system according to claim 1, wherein
the first frame includes a first contact within a first plane intersecting with the first reflecting surface of the first reflective optical element, and
the first plane extending along a direction at which light is reflected by the first reflecting surface of the first reflective optical element.

8. The optical system according to claim 7, wherein
the second frame includes a second contact within a second plane intersecting with the second reflecting surface of the second reflective optical element, and
the second plane extending along a direction at which light is reflected by the second reflecting surface of the second reflective optical element.

9. The optical system according to claim 1, wherein
the first reflective optical element is a first prism,
the first prism includes a pair of side surfaces positioned at sides of each of the first reflecting surface, a first incident surface, and a first exit surface of the first prism, the pair of side surfaces including the first side surface, and
the first frame includes a holder configured to hold the pair of side surfaces of the first prism.

10. The optical system according to claim 9, wherein
the second reflective optical element is a second prism,
the second prism includes a pair of side surfaces positioned at sides of each of the second reflecting surface, a second incident surface, and a second exit surface of the second prism, the pair of side surfaces including the second side surface, and
the second frame includes a holder configured to hold the pair of side surfaces of the second prism.

11. The optical system according to claim 1, wherein the first imaging optical system includes a plurality of first reflective optical elements including the first reflective optical element.

12. The optical system according to claim 11, wherein the second imaging optical system includes a plurality of second reflective optical elements including the second reflective optical element.

13. The optical system according to claim 1, wherein
the first and second imaging optical systems are disposed to receive light from subjects in different directions, and
the first reflective optical element and the second reflective optical element reflect the light from the subjects to opposite directions.

14. An imaging system, comprising:
the optical system according to claim 1;
a first image sensor to form a first image captured by the first imaging optical system; and
a second image sensor to form a second image captured by the second imaging optical systems.

15. An imaging apparatus, comprising:
a casing which accommodates the imaging system according to claim 14 within the casing; and
operation means for operating the imaging system.

16. The imaging system according to claim 14, wherein the first and second images are combined to obtain a combined image.

17. The optical system according to claim 1, wherein
the first wall has a first wall surface orthogonal to both a first incident surface and the first reflecting surface of the first reflective optical element,
the second wall has a second wall surface orthogonal to both a second incident surface and the second reflecting surface of the second reflective optical element,
the first side surface and the first reflective optical element are bonded together, and
the second side surface and the second reflective optical element are bonded together.

18. The optical system according to claim 17, wherein
the first wall surface protrudes with different amounts along an optical axis of light incident on the first reflective optical element and does not cover the first reflecting surface so that the first reflecting surface is exposed, and
the second wall surface protrudes with different amounts along an optical axis of light incident on the second reflective optical element and does not cover the second reflecting surface so that the second reflecting surface is exposed.

* * * * *